US010956909B2

(12) United States Patent
Schukai et al.

(10) Patent No.: US 10,956,909 B2
(45) Date of Patent: Mar. 23, 2021

(54) SYSTEMS AND METHODS FOR IDENTITY ATOMIZATION AND USAGE

(71) Applicant: REFINITIV US ORGANIZATION LLC, New York, NY (US)

(72) Inventors: Robert Joseph Schukai, Marietta, GA (US); David Costa Faidella, Sidcup (GB); Bartholomew J. DiVita, Babylon, NY (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 240 days.

(21) Appl. No.: 16/007,581

(22) Filed: Jun. 13, 2018

(65) Prior Publication Data

US 2018/0315053 A1 Nov. 1, 2018

Related U.S. Application Data

(63) Continuation-in-part of application No. 15/922,505, filed on Mar. 15, 2018.

(Continued)

(51) Int. Cl.
*G06F 21/00* (2013.01)
*G06Q 20/40* (2012.01)

(Continued)

(52) U.S. Cl.
CPC ..... *G06Q 20/40145* (2013.01); *G06F 16/901* (2019.01); *G06Q 20/3821* (2013.01);

(Continued)

(58) Field of Classification Search
None
See application file for complete search history.

(56) References Cited

U.S. PATENT DOCUMENTS 6,260,059 B1 * 7/2001 Ueno .................... G06N 5/043 709/202
6,618,751 B1 9/2003 Challenger et al.

(Continued)

FOREIGN PATENT DOCUMENTS

JP 4581200 B2 11/2010
KR 20160022978 A 3/2016

OTHER PUBLICATIONS

International Search Report and Written Opinion dated May 10, 2018, of the corresponding International Application PCT/US2018/022677 filed Mar. 15, 2018, 14 pages.

(Continued)

*Primary Examiner* — Maung T Lwin
(74) *Attorney, Agent, or Firm* — Norton Rose Fulbright US LLP

(57) ABSTRACT

A method of providing identity information may include: receiving, from a transaction system, a request regarding a transaction; retrieving at least one rule defining a compliant identity based on a type of the transaction, the at least one rule identifying a plurality of identity attributes; retrieving an identity index map including a list of pointers to available identity components; selecting pointers from the identity index map pointing to identity components corresponding to the plurality of identity attributes; outputting, to the transaction system, the compliant identity including information corresponding to each of the identity components, the information including for each identity component at least one of: the selected pointers to the identity component, or the identity component.

23 Claims, 15 Drawing Sheets

Related U.S. Application Data

(60) Provisional application No. 62/519,440, filed on Jun. 14, 2017, provisional application No. 62/506,090, filed on May 15, 2017, provisional application No. 62/490,818, filed on Apr. 27, 2017.

(51) Int. Cl.

| | |
|---|---|
| ***G06Q 50/26*** | (2012.01) |
| ***G06F 16/901*** | (2019.01) |
| ***G06Q 20/38*** | (2012.01) |

(52) U.S. Cl.

CPC ....... *G06Q 20/405* (2013.01); *G06Q 20/4014* (2013.01); *G06Q 50/265* (2013.01)

(56) References Cited

U.S. PATENT DOCUMENTS

| | | | | |
|---|---|---|---|---|
| 7,107,281 | B2 * | 9/2006 | De La Huerga | G06F 16/22 707/694 |
| 7,970,856 | B2 * | 6/2011 | Goodman | H04L 67/28 709/217 |
| 8,468,244 | B2 * | 6/2013 | Redlich | G06Q 10/06 709/225 |
| 8,782,236 | B1 | 7/2014 | Marshall et al. | |
| 2003/0028493 | A1 | 2/2003 | Tajima et al. | |
| 2007/0214220 | A1 | 9/2007 | Alsop et al. | |
| 2007/0245144 | A1 | 10/2007 | Wilson | |
| 2009/0234908 | A1 * | 9/2009 | Reyhner | G06F 9/546 709/203 |
| 2010/0088389 | A1 | 4/2010 | Buller et al. | |
| 2011/0041172 | A1 | 2/2011 | Dennis et al. | |
| 2012/0066517 | A1 | 3/2012 | Vysogorets et al. | |
| 2012/0210341 | A1 * | 8/2012 | Burke, II | H04L 63/08 725/23 |
| 2013/0227110 | A1 * | 8/2013 | Bacher | H04L 41/0206 709/223 |
| 2013/0275386 | A1 | 10/2013 | Shin | |
| 2013/0282580 | A1 * | 10/2013 | O'Brien | G06Q 50/265 705/44 |
| 2015/0222704 | A1 | 8/2015 | Kipp et al. | |
| 2015/0294118 | A1 | 10/2015 | Parker et al. | |
| 2015/0304444 | A1 | 10/2015 | Lundborg | |
| 2016/0034896 | A1 | 2/2016 | O'Brien et al. | |
| 2016/0071099 | A1 | 3/2016 | Lazay | |
| 2017/0277774 | A1 | 9/2017 | Eigner et al. | |

OTHER PUBLICATIONS

Paci F et al: "An Interoperable Approach to Multifactor Identity Verification", Computer, IEEE Computer Society, USA, vol. 42, No. 5, May 1, 2009 (May 1, 2009), pp. 50-57. XP011262152, ISSN: 0018-9162. 8 pages.

Supplementary EP Search Report dated May 4, 2020, of the corresponding EP application EP18792051, 8 pages.

* cited by examiner

United States of America
REAL ID Travel Verification

Name DAN SMITH
DOB 12/31/1968

Passport United States
Passport No. 93282346289
Passport Status Compliant

Height 5-07
Weight 130
Eyes BLU

Travel Status Compliant

SYSTEMS AND METHODS FOR IDENTITY ATOMIZATION AND USAGE

CROSS REFERENCE TO RELATED APPLICATIONS

This application claims priority to U.S. Provisional Patent Application No. 62/519,440, filed on Jun. 14, 2017; and also is a continuation-in-part of and claims priority to U.S. patent application Ser. No. 15/922,505, filed on Mar. 15, 2018, which claims priority to U.S. Provisional Patent Application No. 62/490,818, filed on Apr. 27, 2017, and U.S. Provisional Patent Application No. 62/506,090, filed on May 15, 2017; each of the above applications being hereby incorporated by reference herein in their entireties.

BACKGROUND INFORMATION

In many types of transactions, and other scenarios, an individual must provide identity information to conduct the transaction. For example, to purchase alcohol, an individual is typically required to display a state identification, such as a state driver's license.

One problem prevalent in many such transactions is that the required identification actually contains more information about the individual than is legally or otherwise required to conduct the transaction. For example, to purchase alcohol, all that is legally required to be presented is proof that the person is over the legal age to purchase alcohol, an image associated with the proof that looks like the person, and proof that the presented information is valid. However, when a person displays a state driver's license, they are actually displaying much more personal information than this, including their address, their exact date of birth, the driver's license number, an organ donor status, etc.

Presenting more personal information than is necessary during a transaction has many privacy-related downsides that are desirable to avoid. Continuing the above example, when the person presents the state driver's license to purchase alcohol, oversharing of personal information such as their address may subject them to negative consequences such as stalking.

Thus, a need exists for systems and methods to provide identity information for conducting transactions that limits the provided information to only that required by the transaction.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Distributed Data Architecture

Figure 1:
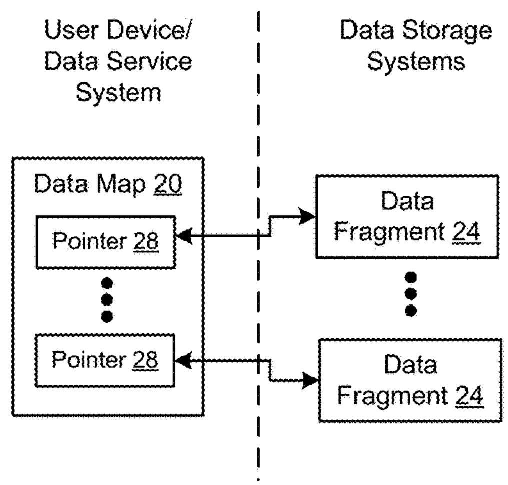
FIG. 1 is a schematic diagram depicting an embodiment of a distributed data architecture.

FIG. 1 depicts an embodiment of a distributed data architecture providing improved security for storage of and access to at least one data element. The distributed data architecture includes a data map 20 stored on a first system, such as a user device or data service system, and a plurality of fragments 24 of the at least one data element stored at a plurality of different storage locations on one or more second systems separate from the first system. For each data element stored by the distributed data architecture, the data map 20 includes a plurality of pointers 28 pointing to the plurality of the data fragments 24 making up the data element.

Storing and/or accessing the data element may include a two stage process. In a first stage, or set of steps, the data map 20 is created, stored and/or accessed to create, store and/or access the pointers 28 identifying the locations of the data fragments 24 making up the data element. In a second stage, or set of steps, the plurality of the data fragments 24 are created, stored and/or accessed to create, store and/or access the data element. Both the data map 20 and/or first system, on the one hand, and the data fragments 24 and/or second system(s), on the other hand, provide security measures including, e.g., encryption, access policies, etc. Additionally, the first and second systems may be separate computing systems, the second system(s) may be located remotely from the first system, and the plurality of different storage locations may each be on separate second systems, be on separate devices, or require separate access transactions.

The distributed data architecture thus provides improved security for storage of and access to data elements. The distributed, multi-tiered structure of the data architecture, including the data map 20 as a first tier, and the data fragments 24 constituting the data elements as a second tier distributed remotely from the first tier, provides improved security by limiting the damage that may be immediately done by an improper breach of the system, as such a breach likely results only initially in access of the first tier, enabling further protection of the actual data elements, which must be accessed through both the first and second tiers. Moreover, to breach both tiers of the distributed data architecture, one must potentially breach a plurality of different data security systems, including, e.g., the encryption, etc. of the data map 20 and first system on the one hand, and the encryption, etc. of the data fragments 24 and second system(s) on the other hand, before the data elements may be accessed.

Figure 2:
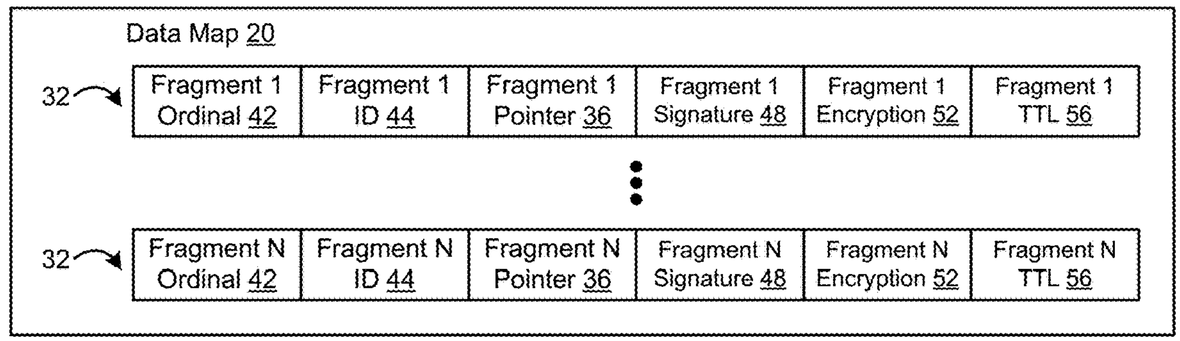
FIG. 2 is a schematic diagram depicting an embodiment of a data map of the distributed data architecture.

FIG. 2 depicts an embodiment of a data map 20, including a plurality of map elements 32 for each data element stored according to the distributed data structure. Each map element 32 corresponds to a different respective data fragment 24 of the data element, and includes a pointer data field 36 and optionally one or more additional data fields. The pointer data field 36 includes a pointer 28 to the location of the data fragment 24 corresponding to that map element 32 on a corresponding second system. The pointer 28 may take a variety of different forms, such as an Internet address, an FTP address, a web address, etc.

The additional data fields may include one or more of a fragment order field 42, a fragment identifier field 44, a fragment signature field 48, a fragment encryption field 52, or a fragment time-to-live field 56. The fragment order field 42 includes an order number of the fragment within the fragments 24 of the data element, for use in ordering the fragments 24 to reconstruct the data element. The fragment identifier field 44 includes an identifier uniquely identifying the fragment 24, such as a hash of a payload of the fragment 24. The fragment signature field 48 includes a cryptographic signature of the entire data fragment 24, such as for use in validating a fragment 24 upon retrieval to verify that it has not been altered. The fragment encryption field 52 includes information about the encryption scheme used to encrypt the fragment 24, such as for use in decrypting the fragment 24. The time-to-live field 56 includes a time-to-live attribute of the data fragment 24, such as indicating a time period for which the data fragment 24 is valid In embodiments, a data map may include only any subset of, or an alternative connection or ordering of, the features depicted in or discussed herein in regard to FIG. 2.

Figure 3:
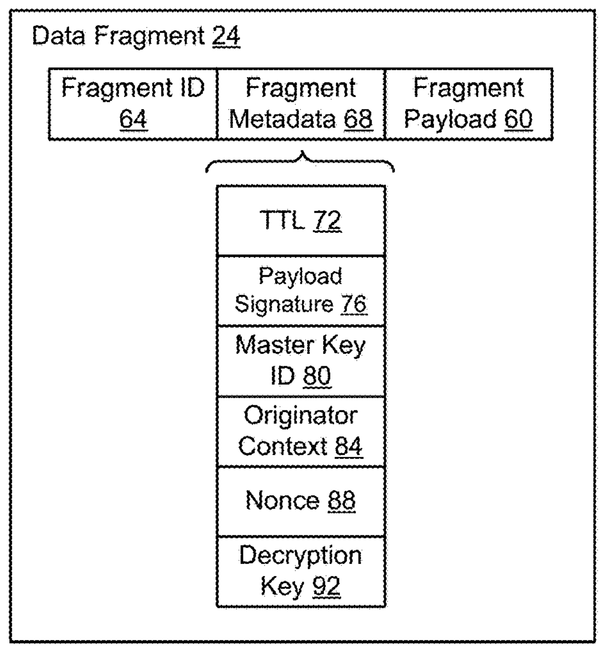
FIG. 3 is a schematic diagram depicting an embodiment of a data fragment of the distributed data architecture.

FIG. 3 depicts an embodiment of a data fragment 24. The depicted fragment 24 includes a fragment payload field 60 and optionally one or more additional data fields. The fragment payload field 60 includes the fragment of the data element. The fragment may be stored in the fragment payload field 60 in an encrypted form.

The depicted additional fields include a fragment identifier field 64 and fragment metadata fields 68. The fragment identifier field 64 includes the unique identifier of the data fragment 24. The depicted metadata fields 68 include a time-to-live field 72, a payload signature field 76, a master key identifier field 80, an originator context field 84, a nonce field 88, and a decryption key field 92. The time-to-live field 72 includes the time-to-live attribute of the data fragment 24. The payload signature field 76 includes a cryptographic signature of the payload field 60, such as for use in validating the payload upon retrieval to verify that it has not been altered. The master key identifier field 80 includes a unique identifier of the master key used to encrypt a fragment decryption key, such as for use, along with the nonce field 88, to generate a unique encryption key per fragment 24. The originator context field 84 includes any relevant information about the issuer of the fragment 24. The nonce field 88 includes a nonce value, such as may be used to randomize an encryption key used to encrypt the fragment decryption key. The fragment decryption key field 92 includes a randomized encryption key that can decrypt the fragment 24, encrypted with the master key.

In embodiments, a data fragment may include only any subset of, or an alternative connection or ordering of, the features depicted in or discussed herein in regard to FIG. 3.

Figure 4:
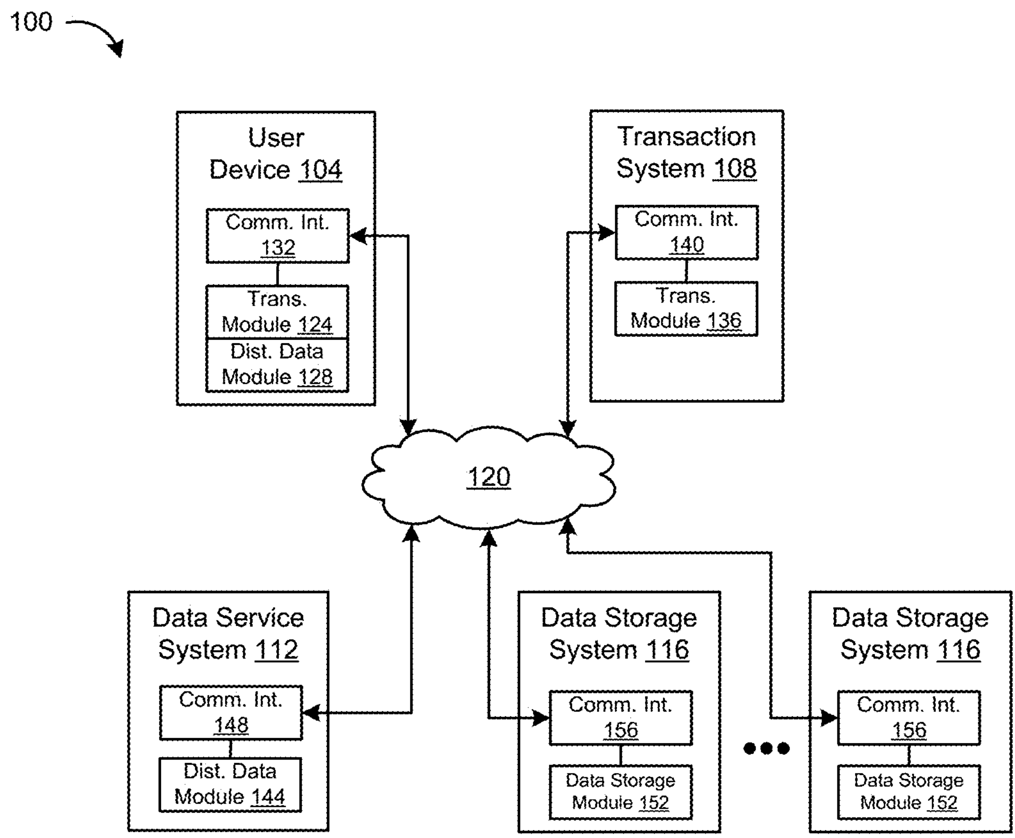
FIG. 4 is a schematic diagram depicting an embodiment of system for conducting a transaction, and processing data, according to the distributed data architecture.

FIG. 4 depicts an embodiment of a system 100 for conducting a transaction using the distributed data architecture. The depicted system 100 includes a user device 104, a transaction system 108, a data service system 112, one or more data storage systems 116, and one or more communication networks 120.

The user device 104 is used by a user to communicate with the transaction system 108 via one or more communication networks 120 to conduct a transaction with the transaction system 108. The user device 104 includes a transaction module 124, a distributed data module 128, and a communication interface 132. The transaction module 124 communicates, using the communication interface module 132 via the one or more communication networks 120, with the transaction system 108 to conduct the transaction. The distributed data module 128 communicates, using the communication interface module 132 via the one or more communication networks 120, with the data service system 112 and/or data storage systems 116 to retrieve data elements according to the distributed data architecture, for provision, such as via the transaction module 124, to the transaction system 108 for conducting the transaction.

The transaction system 108 is a system used by a person or organization to conduct the transaction with the user. The transaction system 108 includes a transaction module 136 and a communication interface module 140. The transaction module 136 communicates, using the communication interface module 140 via the one or more communication networks 120, with the user device 104, data service system 112 and/or data storage systems 116 to conduct the transaction.

The data service system 112 is a system providing data services to the user device 104 via one or more communication networks 120 to enable conducting the transaction with the transaction system 108 using the distributed data architecture. The data service system 112 includes a distributed data module 144 and a communication interface module 148. The distributed data module communicates 144, using the communication interface module 148 via the one or more communication networks 120, with the user device 104 and/or data storage systems 116 to provide data services according to the distributed data architecture.

The data storage systems 116 store and provide access via one or more communication networks 120 to the data fragments of the distributed data architecture. The data storage systems 116 each include a data storage module 152 and a communication interface 156. The data storage module 152 stores and provides selective access for the user device 104 and/or data service system 112, using the communication module 156 via the one or more communication networks 120, to one or more data fragments of the distributed data architecture.

In embodiments, the plurality of different storage locations at which the plurality of data fragments 24 are stored may include locations at a corresponding plurality of different data storage systems 116. For example, each of the plurality of the data fragments 24 may be stored using a respective different one of a plurality of the data storage systems 116. In such embodiments, each data storage system 116 may be implemented using a separate computing system.

In embodiments, the plurality of different data storage locations at which the plurality of data fragments 24 are stored may include locations at a corresponding plurality of different data storage devices. For example, each of the data fragments 24 may be stored using a respective different one of a plurality of different data storage devices. The data storage devices may include hard drives, flash memories, etc. In such embodiments, a plurality of the different data storage devices may be part of a single data storage system 116 (for example, the data storage module 152 may include a plurality of different data storage devices), part of a plurality of different data storage systems 116 (for example, a plurality of data storage systems 116 may each include a data storage module 152 including a respective one of the plurality of data storage devices), or combinations thereof.

In embodiments, the plurality of different data storage locations at which the plurality of data fragments 24 are stored may include multiple locations on a single data storage system 116 or device. For example, each of the data fragments may be stored at different data storage locations on a single data storage system 116 or device. In such embodiments, each of the plurality of different data storage locations may require a separate storage and/or access transaction, or set of steps, to store and/or access data at that data storage location. In one example, the plurality of different data storage locations may be within a plurality of different partitions of, or behind other logical or physical boundaries within, the data storage system 116 or device that would require such separate transactions or sets of steps.

The one or more communication networks 120 may include one or more of the Internet, a cellular network, a wireless local area network (e.g., WiFi), etc.

The transaction may include one or more of: a security transaction, in which the user provides identity data to prove his or her identity to the transaction system 108; a financial transaction, in which the user conducts a financial transaction, such as purchasing an item, making a payment, exchanging currency, etc.; other types of transactions in which the user provides some type of data regarded as sensitive to the transaction system 108; or variations and/or combinations of these types of transactions.

Embodiments of the user device 104, transaction system 108, data service system 112, data storage systems 116, and/or any individual one, subset, or all of the components thereof, such as the communication interfaces, transaction modules, distributed data modules, data storage modules, etc., may be implemented as hardware, software, or a mixture of hardware and software. For example, each of the user device, transaction system, data service system, data storage systems, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In exemplary embodiments, each of the user device, transaction system, data service system, data storage systems, and/or any individual one, subset, or all of the components thereof, may be implemented using one or more computer systems, such as, e.g., a mobile computing device, a desktop computer, laptop computer, network device, server, Internet server, cloud server, etc.

In embodiments, a system for conducting a transaction using the distributed data architecture may include only any subset of, or an alternative connection or ordering of, the features depicted in or discussed herein in regard to FIG. 4.

Figure 5:
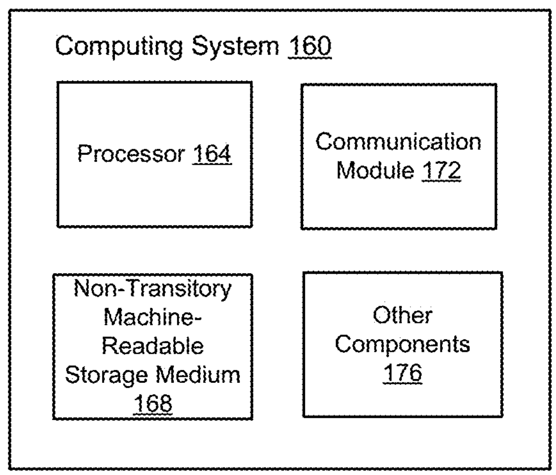
FIG. 5 is a schematic diagram depicting an embodiment of a computing system for implementing components of the system for conducting a transaction and processing data.

FIG. 5 depicts an embodiment of a computer system 160 that may be used to implement the user device 104, transaction system 108, data service system 112, data storage systems 116, and/or any individual one, subset, or all of the components thereof. The computer system 160 includes a processor 164, a non-transitory machine-readable storage medium 168, a communication circuit 172, and optionally other components 176. The processor 164 executes program instructions stored in the non-transitory machine-readable storage medium 168 to perform the functionality of the component it is implementing as discussed herein. The communication circuit 172 can be controlled by the processor 164 to communicate with other devices, such as the user device 104, transaction system 108, data service system 112 and/or data storage systems 116, to perform the functionality of the component it is implementing as discussed herein. The optional other components 176 may include any further components required by the computer system 160 to perform this functionality.

In embodiments, a computer system that may be used to implement the user device, transaction system, data service system, data storage systems, and/or any individual one, subset, or all of the components thereof may include only any subset of, or an alternative connection or ordering of, the features depicted in or discussed herein in regard to FIG. 5.

Figure 6:
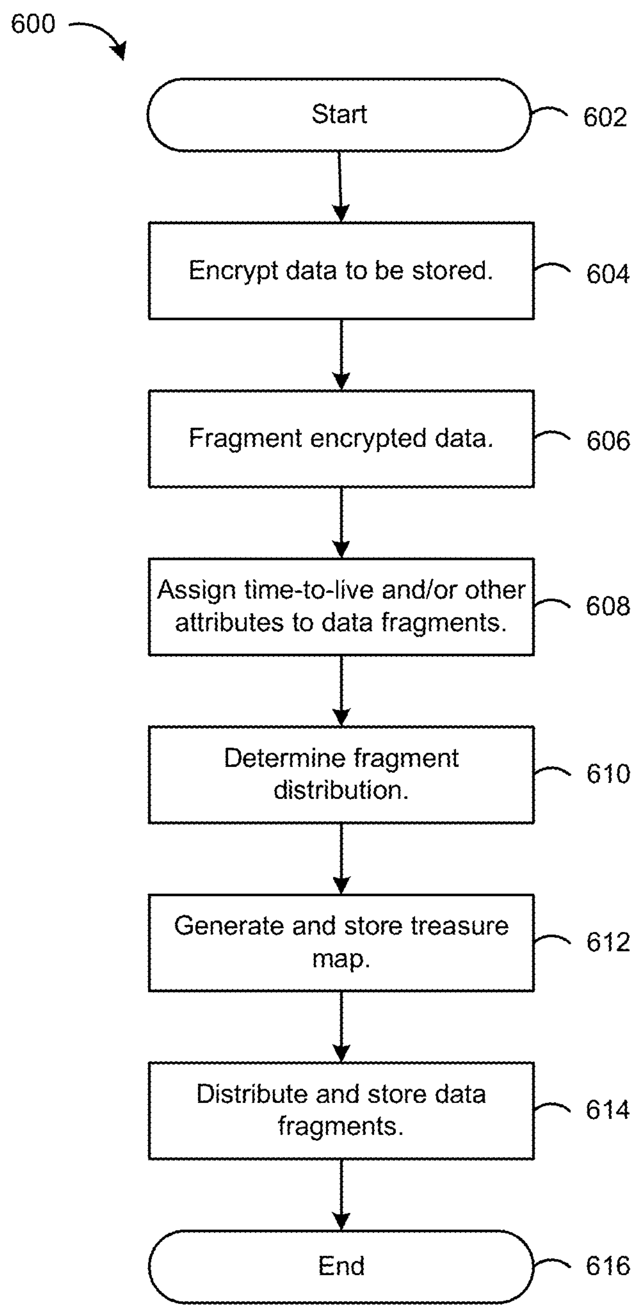
FIG. 6 is a flowchart depicting an embodiment of a method of processing data according to the distributed data architecture.

FIG. 6 depicts an embodiment of a method 600 of processing and storing data according to the distributed data architecture to enable use of the data in conducting transactions according to the distributed data architecture. The method provides the improved security of the distributed data architecture for data stored according to the distributed data architecture. The method may be performed by or involving components of the system of FIG. 4, such as by the user device 104 and/or data service system 112. The method begins at step 602.

At step 604, data elements to be stored according to the distributed data architecture are encrypted. The data elements may be encrypted using various different encryption techniques. For example, the data element may be encrypted using one or more of an encryption standard, such as the Advanced Encryption Standard (AES), Rivest-Shamir-Adleman (RSA), etc.; a hashing standard, such as the Secure Hash Algorithm 2 (SHA-2), etc.; a digital signature, such as RSA, elliptic curve Digital Signature Algorithm (ECDSA), Digital Signature Standard (DSS), etc.; public key infrastructure (PKI); secret sharing algorithms, such as Shamir's Secret Sharing, etc.

At step 606, each encrypted data element is split apart into a plurality of separate data fragments 24. Each data fragment 24 is a different portion of the data element, and together, the plurality of data fragments 24 constitute the entire data element. The data element may be split using various different splitting techniques. For example, the data element may be split to create a plurality of data fragments 24 having contiguous portions of the original data element. Alternatively, the data element may be split into a plurality of sub-fragments, numbering a multiple of an eventual number of the plurality of data fragments 24, and then the subfragments combined to form the fragments 24, such as by combining interleaved slices of the data element, or by combining random slices of the data element, into each fragment 24. In another alternative, the data element may be split into a plurality of data fragments 24 or subfragments as part of an encryption process using a secret sharing algorithm such as Shamir's Secret Sharing.

In embodiments, the order of steps 604 and 606 may be reversed. That is, the data element may first be split into the plurality of fragments 24, and then each of the fragments 24 encrypted using the encryption techniques.

At step 608, time-to-live (TTL) attributes are assigned to each of the data fragments 24. The TTL attributes provide even further security for the distributed data architecture by controlling the time period for which the data fragments 24, and thus the data elements constituted by the data fragments 24, are valid and accessible. Controlling access to the data as a function of time further limits the potential for improper access to the data, as it prevents the presence of data from being forgotten and left in a potentially unsecure state by automatically invalidating and preventing access to the data once the selected lifetime of the data has expired. The TTL attribute may indicate the validity time period in a variety of ways. For example, the TTL attribute may include one or more of a time at which the validity of the fragment expires, a time at which the validity of the fragment begins, etc.

At step 610, a distribution of the plurality of encrypted fragments 24 among a plurality of separate data storage locations is determined. In embodiments, the plurality of different data storage locations may be at separate data storage systems 116, separate storage devices, or combinations thereof. The plurality of different data storage systems 116 or devices also may be located at physically separate locations, such as at separate storage facilities. Storing a plurality of data fragments 24 on a plurality of different data storage systems 116 or devices generally may require a separate data storage transaction or set of steps for each system 116 or device. In embodiments, the plurality of different data storage locations may include a plurality of different locations on a single data storage system 116 or device, where the plurality of different locations may each require a separate transaction or set of steps to store or access data at such location. The distribution may be determined in a variety of ways. For example, the distribution may be determined by distributing each fragment 24 to a different one of the plurality of separate data storage locations.

At step 612, a data map 20 including a map element 32 corresponding to each of the data fragments 24 is generated and stored. The data map 20 and constituent map elements 32 may take a variety of forms, such as, e.g., the form of the exemplary data map 20 and map elements 32 depicted in FIG. 2. Each map element 32 includes a field containing a pointer 28 to the location at the data storage system 116 on which the corresponding data fragment 24 is stored. The map elements 32 may include one more further fields containing further information, such as one or more of the TTL attribute and the other information discussed above in regard to FIG. 2. The generated data map 20 may be stored in various locations. For example, the data map 20 may be stored on the user device 104 or the data service system 112, according to various different embodiments, such as discussed further below in regard to FIGS. 8A-8D.

At step 614, the encrypted data fragments 24 are distributed to and stored at the plurality of separate data storage locations according to the determined distribution. The distribution and storage of each data fragment 24 at a corresponding one of the plurality of different data storage locations may include executing a corresponding separate transaction or set of steps to perform the distribution and storage. The method ends at step 616.

In embodiments, a method of a method of processing and storing data according to the distributed data architecture may include only any subset of, or an alternative ordering of, the features depicted in or discussed above in regard to FIG. 6.

Figure 7:
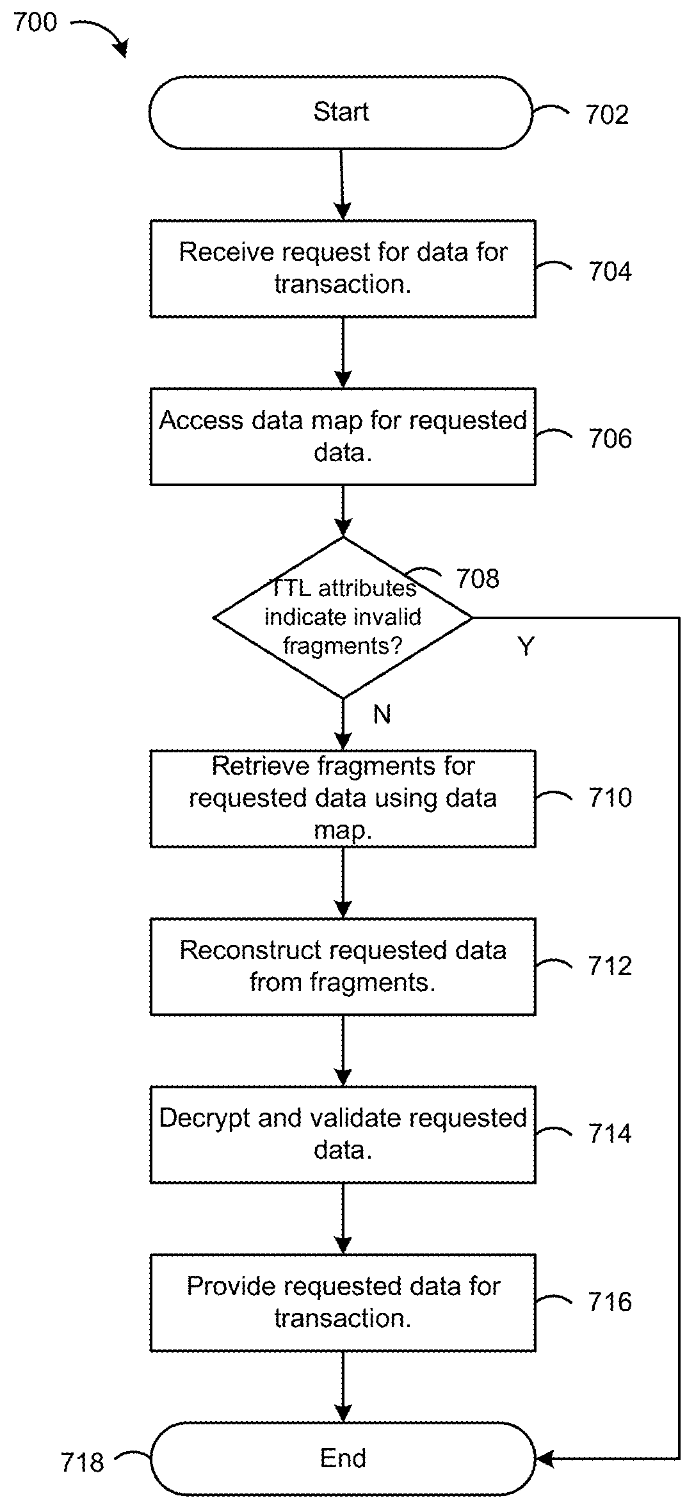
FIG. 7 is a flowchart depicting an embodiment of a method of conducting a transaction using data stored according to the distributed data architecture.

FIG. 7 depicts an embodiment of a method 700 of conducing a transaction using data stored according to the distributed data architecture. The method provides the improved security provided by the distributed data architecture for data involved in the transaction. The method may be performed by or involving components of the system of FIG. 4, such as by the user device 104 and/or data service system 112. The method begins at step 702.

At step 704, a request for one or more data elements for conducting a transaction is received. In embodiments in which a user uses the user device 104 to conduct a transaction with the transaction system 108, the request may be received by the user device 104 from the transaction system 108. For example, the user device 104 may be a mobile device, such as a smart phone, tablet, etc., and the transaction system 108 may be an Internet-based system, such as a website, application server, etc. Other types of user devices 104 and transaction systems 108 are also possible.

As discussed above, the transaction may include one or more of a variety of different types of transactions, such as a security authorization, a purchase transaction, a credit application, etc. The requested one or more data elements include data relevant to the transaction. For a security authorization or other identity verifying transaction, the requested data element may include identity data, such as one or more of a name of the user, an mailing address of the user, an email address of the user, a picture of the user, a driver's license number of the user, a passport number of the user, etc. For a purchase, credit application or other financial transaction, the requested data element may include financial data, such as one or more of a currency amount, an account number, a fund transfer authorization, etc. Other types of transactions may involve other types of data elements.

At step 706, a data map 20 corresponding to the requested data element is accessed to determine the pointers 28, TTL attributes, etc. for the data fragments 24 constituting the data element. The data map 20 may be accessed in a variety of ways. In embodiments, the data map 20 is accessed by the user device 104, while in other embodiments, the data map 20 is accessed by the data service system 112. In embodiments, an existing data map 20 is accessed, while in other embodiments, a data map 20 that is generated specifically for conducting the transaction in response to the data element request is accessed. Further details of such embodiments are discussed below in regard to FIGS. 8A-8D.

At step 708, the TTL attributes for the data fragments 24 constituting the requested data element in the data map 20 are examined to determine whether the data fragments 24 are all still currently valid. If the TTL attributes for all of the data fragments 24 constituting the data element indicate that the fragments 24 are currently valid, the method proceeds to step 710 to retrieve the fragments 24, etc. If the TTL attributes for any of the data fragments 24 constituting the data element indicate that fragments 24 are currently invalid, the method proceeds to step 718, where the method ends, to enforce the TTL expiration by preventing retrieval of the expired fragments 24. In embodiments, the examining and enforcing of the TTL attributed may be performed by the user device 104, while in other embodiments it may be performed by the data service system 112. The TTL attributes may be found in the TTL field 56 of the data map 20 and/or the TTL field 72 of the fragment metadata 68 of the fragment 24.

At step 710, the pointers 28 in the data map 20 for the data fragments 24 constituting the requested data element are used to retrieve the data fragments 24. The data fragments 24 may be retrieved in a variety of ways, such as via communication with the data storage system(s) 116 or device(s) containing the data fragments 24 over the one or more communication networks 120 according to data transfer protocols used by such system(s) 116 or device(s). The retrieval of each data fragment 24 from a corresponding one of the plurality of different data storage locations may include executing a corresponding separate transaction or set of steps to perform the retrieval. In embodiments, the retrieving of the data fragments 24 may be performed by the user device 104, while in other embodiments it may be performed by the data service system 112.

At step 712, the data element is reconstructed from the retrieved data fragments 24. In embodiments in which the data element was first encrypted and then fragmented, the data fragments 24 may be directly combined to reconstruct the encrypted data element. In embodiments in which the data element was first fragmented and then the fragments 24 encrypted, the retrieved data fragments 24 may first be decrypted and then combined to reconstruct the data element. The data fragments 24 may be combined to form the data element according to the recipe used to fragment the data element, such as creating contiguous, interleaved or randomized combinations of portions of the data element, which may be determined, e.g., from the map elements 32 corresponding to the data fragments, such as the fragment encryption field 52. In embodiments, the reconstruction of the data element from the retrieved data fragments 24 may be performed by the user device 104, while in other embodiments it may be performed by the data service system 112. In embodiments, prior to reconstruction, or as part of the reconstruction process, each of the retrieved data fragments 24 may be validated, such as using the fragment signature 48, in order to protect against malicious manipulation of the fragments 24 by other parties.

At step 714, the reconstructed data element is decrypted and validated. The data element may be decrypted according to the encryption used to encrypt the data element, which may be determined from the map elements corresponding to the data fragments 24, such as the fragment encryption field 52, and fragment metadata 68. In embodiments in which the data element was first fragmented and then the fragments 24 encrypted, and the retrieved data fragments 24 are decrypted and then combined to reconstruct the data element, the data element may simply be validated, or decrypted and validated if further encryption is still present on the reconstructed data element.

At step 716, the requested data element is provided for conducting the transaction. In embodiments in which a user uses the user device 104 to conduct a transaction with the transaction system 108, the requested data element may be provided by the user device 104 to the transaction system 108. The data element may be encrypted as part of a communication protocol between the user device 104 and the transaction system 108. As a result of providing the data element, the transaction may be performed to completion.

In embodiments, a method of a conducting a transaction using data stored according to the distributed data architecture may include only any subset of, or an alternative ordering of, the features depicted in or discussed above in regard to FIG. 7.

As discussed above, accessing the data map 20, retrieving the data fragments 24, and/or reconstructing the data element may selectively be performed by the user device 104, the data service system 112, or the transaction system 108. FIG. 8A-8D depict embodiments of the method of conducting a transaction of FIG. 7, showing further details with respect to the flow of data between devices during the method.

Figure 8A:
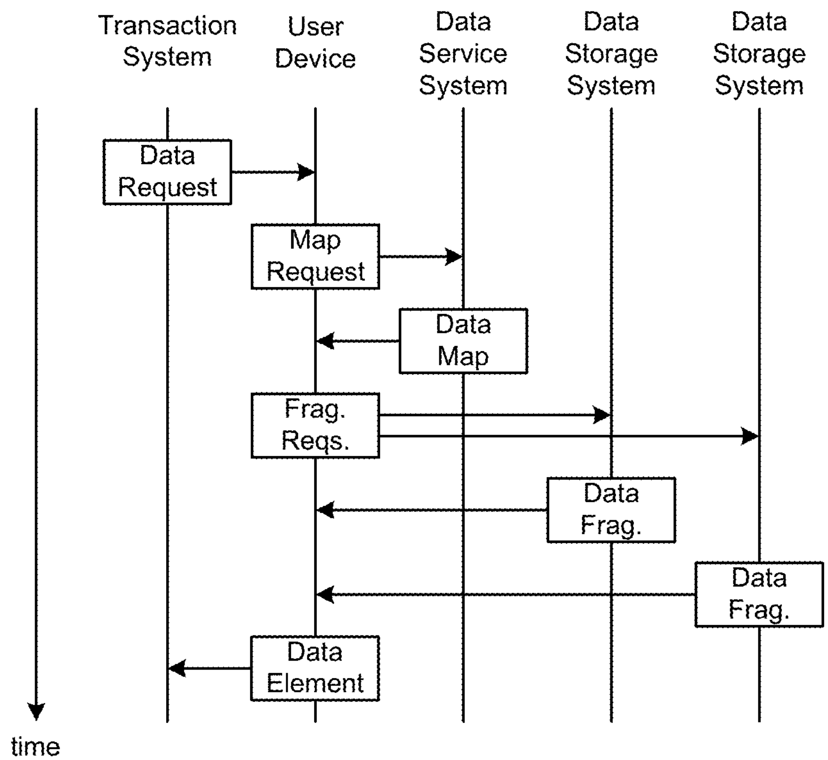
FIG. 8A is a data flow diagram depicting an embodiment of data flows during the method of conducting a transaction using data stored according to the distributed data architecture.

In FIG. 8A, the user device 104 receives the request for the data element from the transaction system 108, then requests the data map from the data service system 112. The data service system 112 may either retrieve an existing data map 20 in its possession, or generate a new data map 20 specifically for the transaction. Storing or generating the data map 20 on the data service system 112 may provide further benefits of the distributed data architecture by limiting the degree of exposure of exposure of the data map 20 to the user device 104, which may involve greater security risks than the data service system 112. Generating a data map 20 specifically for a transaction may also provide further benefits of the distributed data architecture by limiting the degree of exposure of the data map 20 to even the data service system 112, which may even itself entail security risks. Moreover, generating a data map 20 specifically for a transaction may also provide even further benefits of the distributed data architecture by tailoring the content of the data map 20 to the transaction, and thereby not pointing to, and thus not exposing to risk, data in the data map 20 unnecessary for the transaction.

Returning to FIG. 8A, the data service system 112 provides the data map 20 to the user device 104, which then uses the data map 20 to request the data fragments 24 corresponding to the requested data element from the data storage systems 116. Upon receiving the data fragments 24 from the data storage systems 116, the user device 104 reconstructs the data element, and provides the data element to the transaction system 108. Note that in FIGS. 8A-8D, although two data fragments 24 and two data storage systems 116 are shown, the number of the plurality of data fragments 24 and the one or more data storage systems 116 may vary in various different embodiments.

Figure 8B:
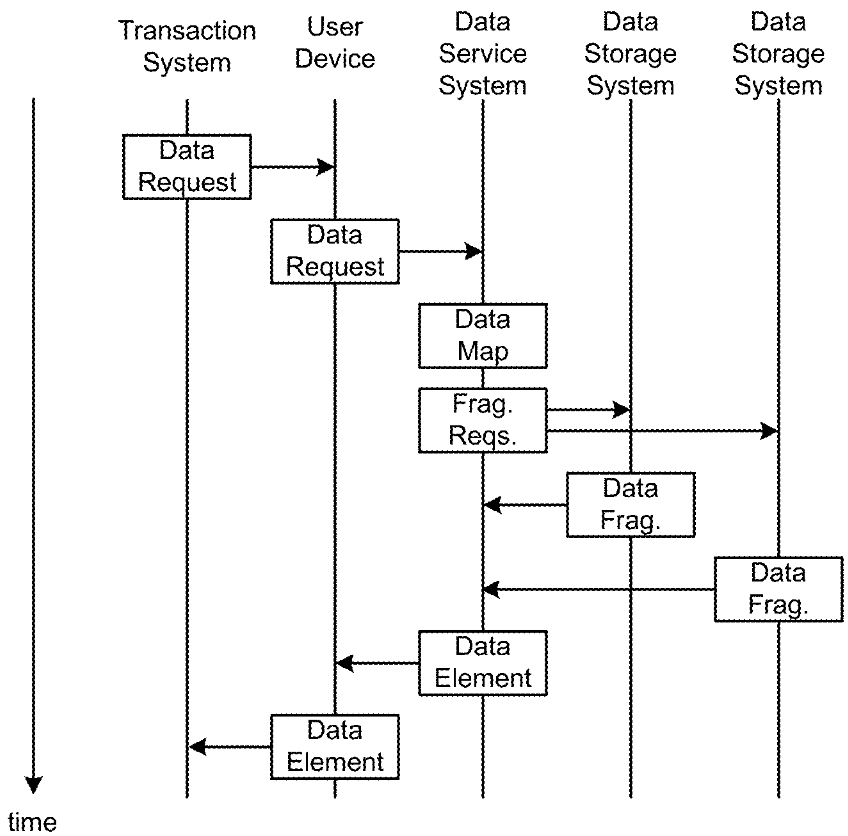
FIG. 8B is a data flow diagram depicting another embodiment of data flows during the method of conducting a transaction using data stored according to the distributed data architecture.

In FIG. 8B, the user device 104 again receives the request for the data element from the transaction system 108, but then requests the data element from the data service system 112. The data service system 112 then either retrieves an existing data map 20 in its possession or generates a new data map 20 specifically for the transaction. The data service system 112 then uses the data map 20 to request the data fragments 24 corresponding to the requested data element from the data storage systems 116. Upon receiving the data fragments 24 from the data storage systems 116, the data service system 112 reconstructs the data element, and provides the reconstructed data element to the user device 104, which provides it to the transaction system 108. Such an embodiment may provide the benefit of locating many of the manipulations of the distributed data architecture on the potentially more secure data service system 112 instead of the user device 104.

Figure 8C:
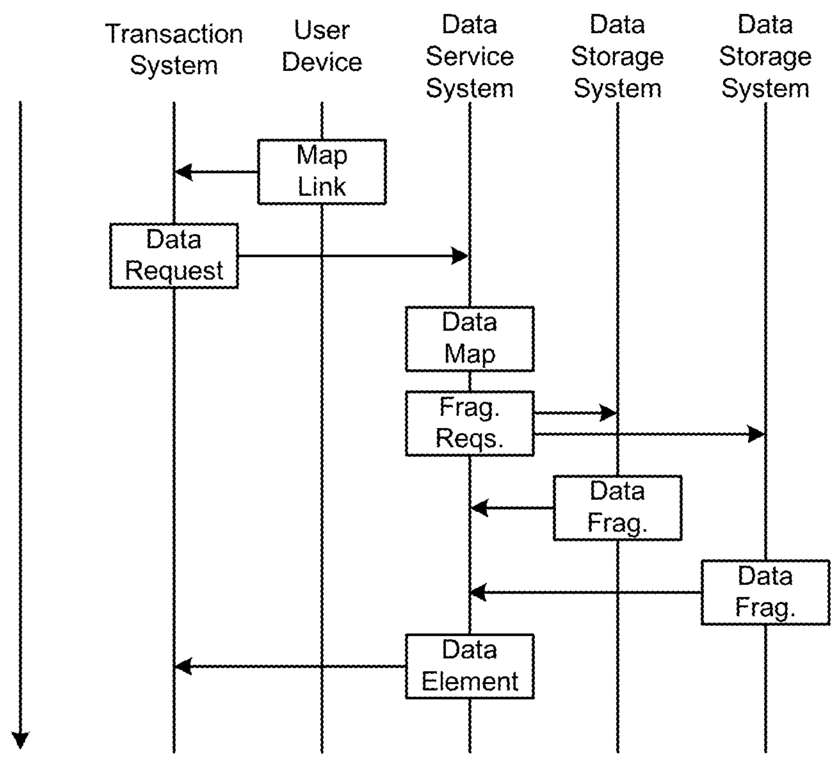
FIG. 8C is a data flow diagram depicting another embodiment of data flows during the method of conducting a transaction using data stored according to the distributed data architecture.

In FIG. 8C, during the transaction the user device 104 provides a link to the data service system 112 to the transaction system 108, such as in response to a request for a data element or other aspect of the transaction. The data service system 112 then receives the request for the data element from the transaction system 108. The data service system 112 then either retrieves an existing data map 20 in its possession, or generates a new data map 20 specifically for the transaction. The data service system 112 then uses the data map 20 to request the data fragments 24 corresponding to the requested data element from the data storage systems 116. Upon receiving the data fragments 24 from the data storage systems 116, the data service system 112 reconstructs the data element, and provides the reconstructed data element to the transaction system 108. This embodiment also may provide the benefit of locating many of the manipulations of the distributed data architecture on the potentially more secure data service system 112 instead of the user device 104.

Figure 8D:
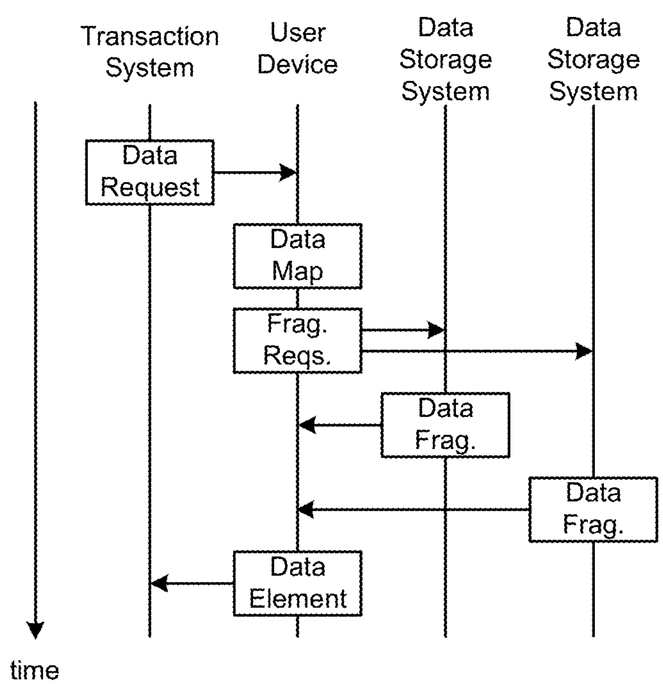
FIG. 8D is a data flow diagram depicting another embodiment of data flows during the method of conducting a transaction using data stored according to the distributed data architecture.

In FIG. 8D, the user device 104 receives the request for the data element from the transaction system 108, and then itself either retrieves an existing data map 20 in its possession or generates a new data 20 map specifically for the transaction. The user device 104 then uses the data map 20 to request the data fragments 24 corresponding to the requested data element from the data storage systems 116. Upon receiving the data fragments 24 from the data storage systems 116, the user device 104 reconstructs the data element, and provides the reconstructed data element to the transaction system 108. This embodiment may provide a benefit of a simplified system by eliminating the need for the data service system 112.

In embodiments, the retrieved data fragments 24 may be provided to the transaction system 108 instead of the reconstructed data element, with the transaction system 108 then reconstructing the data element from the data fragments 24. For example, the embodiments of FIGS. 8A-8D may be adapted to have the device that retrieves the data fragments, such as the user device 104 or data service system 112, forward the retrieved data fragments 24 to the transaction system 108, for reconstruction by the transaction system 108, instead of that device reconstructing the data element and forwarding the reconstructed data element to the transaction system 108.

Figure 9:
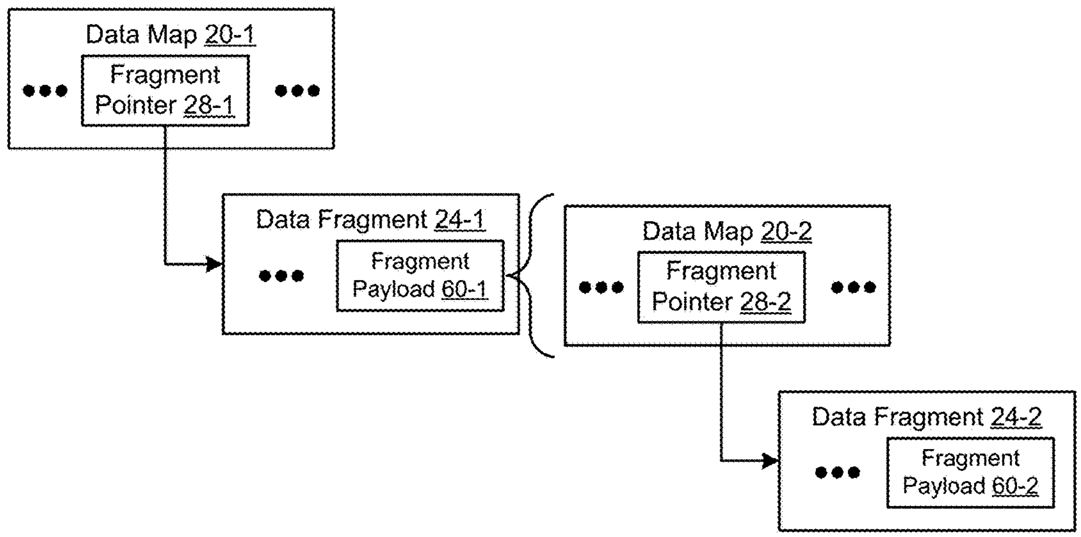
FIG. 9 is a schematic diagram depicting another embodiment of the distributed data architecture.

The distributed data architecture may provide a hierarchy of multiple layers of data maps. FIG. 9 depicts an embodiment of the distributed data architecture having a first data map 20-1 including a plurality of pointers 28-1 to a plurality of data fragments 24-1 (only one of which is shown in the figure). The plurality of fragments 24-1 are distributed to a plurality of different data storage locations as discussed above. The first map 20-1 may map at least one data element to the plurality of data fragments 24-1. However, in the depicted embodiment, the payload 60-1 of at least one of the data fragments 24-1 contains a second data map 20-2 instead of an actual fragment of the data element. The second data map 20-2 itself includes a plurality of pointers 28-2 to a plurality of second data fragments 24-2 (only one of which is shown in the figure). The plurality of second fragments 24-2 are again distributed to a plurality of different data storage locations as discussed above. The second map 20-2 may map the corresponding data fragment 24-1 into the plurality of further data fragments 24-2. The plurality of further fragments 24-2 include payloads 60-2 that contains actual data fragments of the first data fragment 24-1. Providing such a hierarchy of data maps 20 further improves the security of the distributed data architecture by increasing the number of layers of the distributed data architecture that must be traversed by a breach before actual data fragments are reached. Note that, although FIG. 9 shows two layer of data maps 20, other hierarchical embodiments may include any number of layers of data maps 20.

Figure 10A:
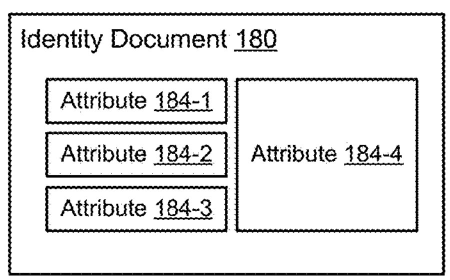
FIG. 10A is a schematic diagram depicting an embodiment of an identity document including data elements.
Figure 10B:
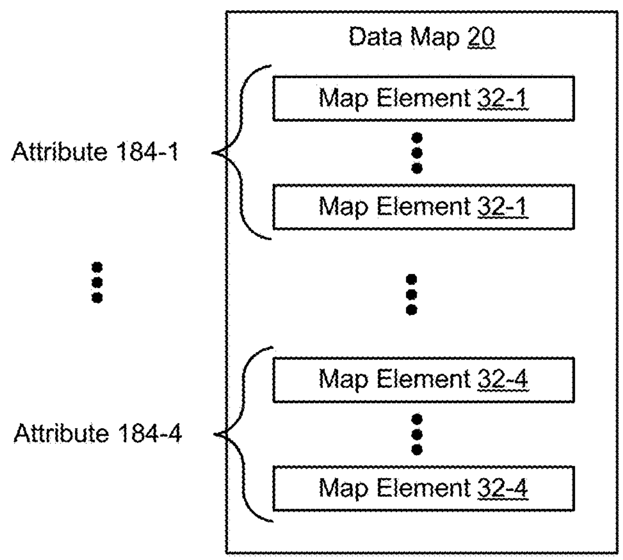
FIG. 10B is a schematic diagram depicting an embodiment of a representation of the identity document stored using the distributed data architecture.

The distributed data architecture may selectively map data elements of a data set in data maps 20 in various ways. For example, the distributed data architecture may map a related set of data elements into a single data map 20. FIG. 10A depicts an embodiment of an identity document 180 such as a driver's license, passport, etc. The identity document 180 has a number of data elements 184, such as a first attribute 184-1 including a name of a person identified by the identity document 180, a second attribute 184-2 including an identification number of the identity document 180, a third attribute 184-3 including a mailing address of the person, and a fourth attribute 184-4 including a picture of the person. FIG. 10B depicts an embodiment of a data map 20 mapping the data elements of the identity document 180. The data map 20 includes a first set of map elements 32-1 including a first set of pointers to map the first attribute to a plurality of first data fragments, a second set of map elements including a second set of pointers to map the second attribute to a plurality of second data fragments, a third set of map elements including a third set of pointers to map the third attribute to a plurality of third data fragments, and a fourth set of map elements 32-4 including a fourth set of pointers to map the fourth attribute to a plurality of fourth data fragments. Other embodiments may selectively map data sets in other ways. For example, in other embodiments, a related data set may be mapped to a plurality of data maps 20, such as mapping the data elements of the identity document 180 to a plurality of different data maps 20. In other embodiments, several data sets may be mapped to a single data map 20.

A hierarchical embodiment of the distributed data architecture may also be used to selectively map data elements of a data set. For example, the identity document 180 depicted in FIG. 10A may be mapped using a hierarchical embodiment of the distributed data architecture such as depicted in FIG. 9. In such embodiments, one or more of the map elements 32-1 . . . 32-4 depicted in FIG. 10B may instead point to data fragments 24 containing an additional data map 20 mapping the actual data fragments 24 or even further layers of data maps 20.

Figure 11:
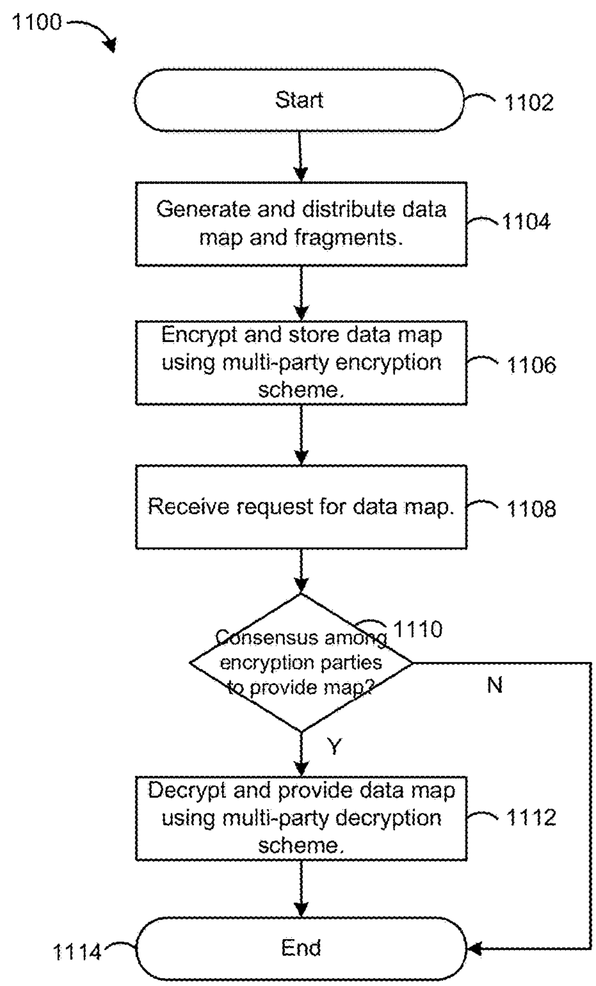
FIG. 11 is a flowchart depicting an embodiment of a method of providing access to a data map.

The distributed data architecture may be used to provide selective access to a data map 20 or copy of a data map 20 to enable various functions, such as recovery of a lost data map 20, providing legally authorized access to data for legal authorities, etc. FIG. 11 depicts an embodiment of a method of providing access to a data map of the distributed data architecture. The method may be performed by or involving components of the system of FIG. 4, such as by the data service system. The method begins at step 1102.

At step 1104, a data map 20 and corresponding data fragments 24 according to the distributed data architecture are generated and distributed. The data map 20 and corresponding data fragments 24 may be generated and distributed as discussed above, such as according to embodiments of the method of FIG. 6.

At step 1106, a copy of the data map 20 is encrypted using a multi-party encryption technique that requires multiple parties to participate in the encryption and any subsequent decryption, and the encrypted data map stored. The multi-party encryption technique may be based on, e.g., Shamir's Secret Sharing, etc. The multiple parties may take various forms, and may include an operator of the data service system 112, operators of the data storage systems 116, other entities, etc. The encrypted data map 20 may be stored by one or more of the data service system 112, one of the data storage systems 116, etc.

At step 1108, a request for the data map 20 is received. A request for access to the data map 20 may be received from various different entities. In one example, the user may lose the user device 104 and any data maps 20 stored on the user device 104, and may need to request to retrieve a copy of the data maps 20 for restoring them onto a new device in order to continue using them. In another example, the user may be the subject of a legal or regulatory proceeding or investigation, and a legal entity, such as a lawyer, law enforcement agency, court, or regulator may have a legal right to access to the data elements, even without authorization by the user. The request may be received by an entity facilitating providing the access to the copy of the data map 20, such as the data service system 112, the data storage system 116, etc.

At step 1110, it is determined whether consensus exists among the multiple parties involved in the encryption and needed to perform the decryption of the copy of the data map 20 as to whether to provide access to the data map 20 for the requesting entity. For example, if the user is requesting access to his or her own data map 20, the multiple parties may be satisfied by the user undergoing an authentication process, such as entering a password, etc. If a legal entity is requesting access to a user's data, such as without authorization by the user, the multiple parties may require the requesting entity to provide a legally sufficient authorization, such as a valid search warrant, etc. If it is determined at step 1110 that there is no consensus to provide access to the data map 20 in response to the request, such as if sufficient the authentication and/or legal authorization has not been provided, the method proceeds to step 1114, where the method ends. If it is determined at step 1110 that there is consensus to provide access in response to the request, such as if sufficient authentication and/or legal authorization has been provided, the method proceeds to step 1112.

At step 1112, the data map 20 is decrypted with input from the multiple parties according to the multi-party decryption scheme, and provided to the requesting entity. The decryption and providing may be performed by an entity facilitating providing the access to the copy of the data map 20, such as the data service system 112, the data storage system 116, etc., with the requisite input from the multiple parties.

In embodiments, a method of providing access to a data map of the distributed data architecture may include only any subset of, or an alternative ordering of, the features depicted in or discussed above in regard to FIG. 11.

Figure 12:
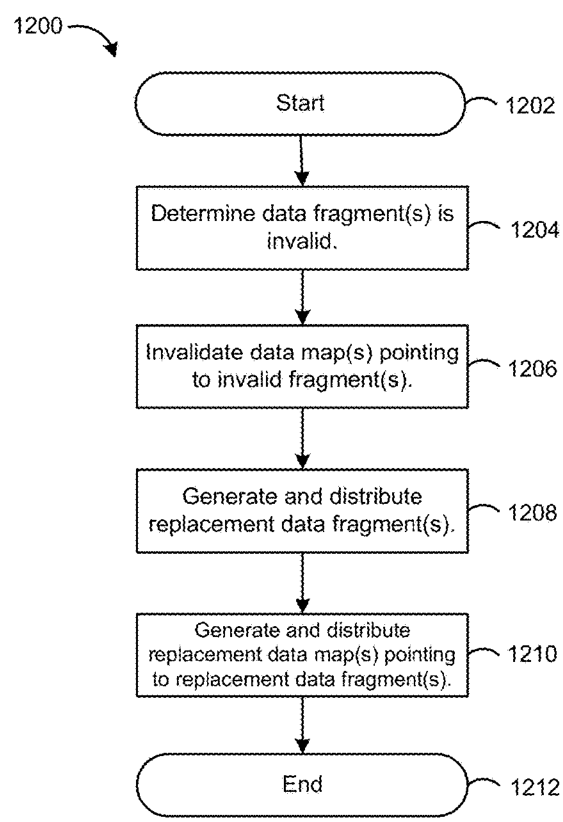
FIG. 12 is a flowchart depicting an embodiment of a method of refreshing data stored according to the distributed data architecture.

The distributed data architecture may be refreshed when one or more data fragments 24 are found to be invalid. FIG. 12 depicts an embodiment of a method of refreshing the distributed data architecture. The method may be performed by or involving components of the system of FIG. 4, such as by the user device 104, data service system 112, data storage systems 116, etc. The method begins at step 1202.

At step 1204, it is determined that one or more data fragments 24 pointed to by one or more data maps 20 are invalid. The determination may be made based on to various factors, such as expiration, revoking, or corruption of the data fragments 24. For example, data fragments 24 of a data element of identity data may be deem to be invalid when an identity document, of which the data element is a part, expires, is revoked, etc. In another example, data fragments 24 may have been found to have suffered corruption of their integrity, such as due to a system failure, unauthorized access, etc. In embodiments, the determination may be performed by the data service system 112, such as either on its own or in response to information that it receives.

At step 1206, any data maps 20 pointing to fragments determined to be invalid are invalidated. The invalidation may be performed in various ways. For example, the data service system 112 may suspend functionality related to the invalidated data maps 20 in its system, delete such data maps 20, and/or communicate such suspension and/or deletion instructions to the user device 108.

At step 1208, one or more replacement data fragments 24 may be generated and distributed. The replacement data fragments 24 may cure the deficiencies of the invalid data fragments 24, such as no longer being a part of an expired, revoked or corrupt data set. The data service system 112 may generate the new data fragments 24 from a valid replacement data element that it receives. The data fragments 24 may be generated and distributed as discussed above, such as using embodiments of the method of FIG. 6.

At step 1210, replacement data maps 20 pointing to the replacement data fragment 24 may be generated and distributed. The replacement data maps 20 may be generated and distributed as discussed above, such as using embodiments of the method of FIG. 6.

In embodiments, a method of refreshing the distributed data architecture may include only any subset of, or an alternative ordering of, the features depicted in or discussed above in regard to FIG. 12.

Additional embodiments of the user device 104, transaction system 108, data service system 112, data storage systems 116, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

Identity Atomization and Mapping

Figure 13:
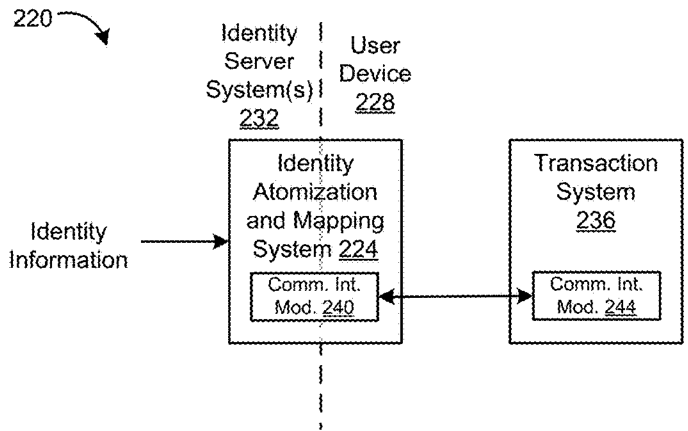
FIG. 13 is a schematic diagram depicting an embodiment of a system for conducting transactions.

FIG. 13 depicts an embodiment of another system for conducting transactions 220, including an identity atomization and mapping system 224 and a transaction system 236.

The identity atomization and mapping system 224 receives identity information, such as from a user device 228 or an identity provider system 232, atomizes the identity information into corresponding identity components, and generates an index to the atomized identity information. The identity atomization and mapping system 224 also provides a compliant identity containing a sufficient set of identity the atomized identity components to the transaction system 236, such as via communication interfaces 240, 244. The compliant identity may include a subset of identity information from a single identity, such as a state or national identity, or may combine information from a plurality of identities, such as a subset of information from each of the plurality of identities.

The identity atomization and mapping system 224 is thus able to provide identity information sufficient to satisfy the requirements of the transaction, while protecting from exposure identity components not required for the transaction, greatly enhancing the privacy of the identity information of the individual. The identity atomization and mapping system 224 also enhances the efficiency of the system for conducting transactions 220 by providing only the sufficient identity information and thereby reducing the transmission and processing costs of providing identity information not required for a transaction.

The identity atomization and mapping system 224 may be implemented on one or more of the user device 28 and the identity server system 232. The user device 228 may be any device used by a user to communicate with the transaction system 236, such as via one or more communication networks or other communication interfaces, to conduct a transaction with the transaction system 236. The identity server system 232 is a system providing identity data services as discussed herein.

The transaction system 236 is a system used by a person or organization to conduct the transaction with the user. The transaction may be one or more of: a security transaction, in which the user provides identity information to prove his or her identity to the transaction system, such as at an airport, building, venue, border, etc., to gain access to a restricted area, such as to a secure area, across a border, etc.; a financial transaction, in which the user provides identity information to conduct and/or authorize conducting of a financial transaction, such as purchasing an item, making a payment, exchanging currency, etc., such as either in person at a point-of-sale location or online; or other types of transactions in which the user provides identity data to the transaction system.

In exemplary embodiments, each of the identity atomization and mapping system 224, user device 228, identity server system 232, transaction system 236, and/or any individual one, subset, or all of the components thereof, may be implemented using one or more computer systems, such as, e.g., a mobile computing device, a desktop computer, laptop computer, network device, server, Internet server, cloud server, etc. For example, the user device 228 may be a mobile computing device, a desktop computer, laptop computer, etc.; the identity server system 232 may be a network device, server, Internet server, cloud server, etc.; and the transaction system 236 may be a kiosk computing device, point-of-sale device, network device, server, Internet server, cloud server, etc.

In embodiments, a system for conducting transactions may include only any subset of, or an alternative connection or ordering of, the features depicted in or discussed herein in regard to FIG. 13.

Figure 14:
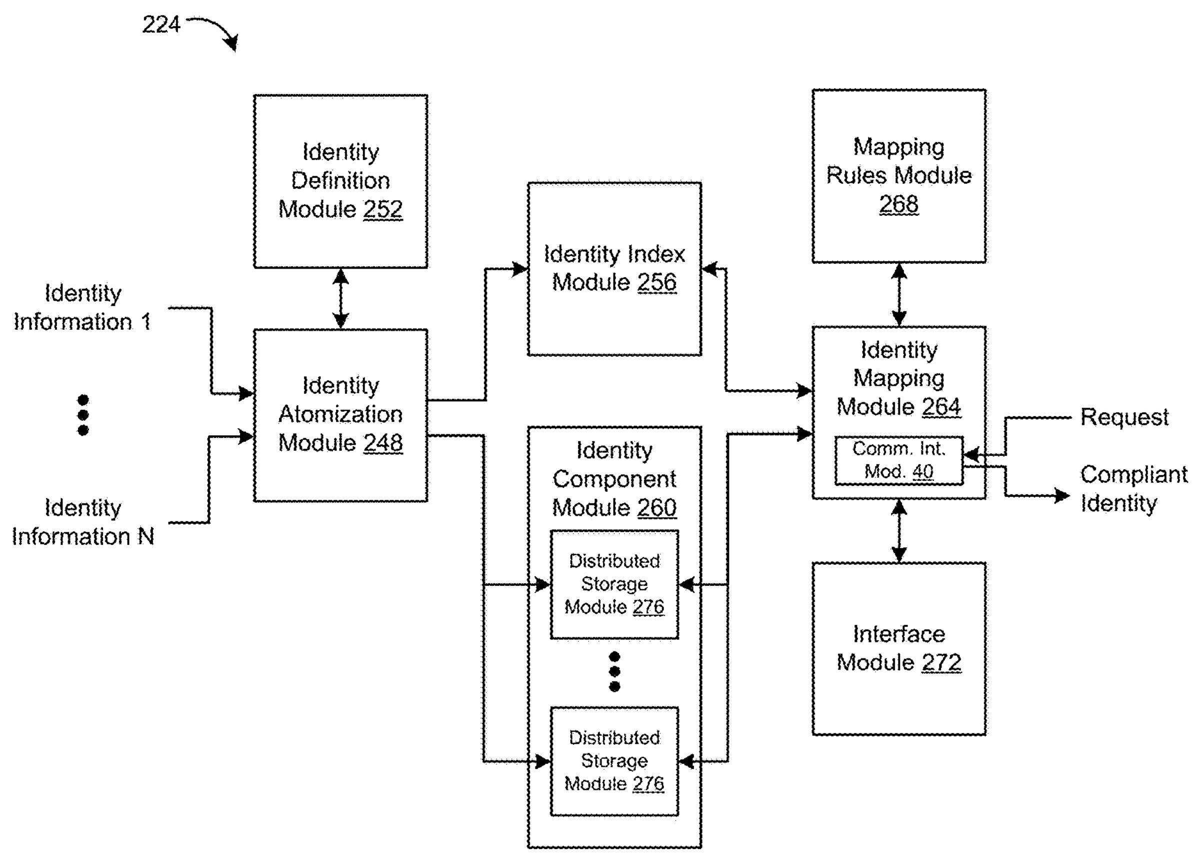
FIG. 14 is a schematic diagram depicting an embodiment of an identity atomization and mapping system.

FIG. 14 depicts an embodiment of the identity atomization and mapping system 224, including an identity atomization module 248, an identity definition module 252, an identity index module 256, an identity component module 260, an identity mapping module 264, a mapping rules module 268, and an interface module 272.

The identity atomization module 248 receives identity information for an individual; atomizes, or separates, the identity information into a plurality of separate identity components corresponding to separate attributes of the identity; and stores the atomized identity components in the identity component module 260. The atomization module 248 atomizes identity information into components based on the type of the identity information, using an identity type definition retrieved from the identity type definition module 252. The atomization module 248 also generates one or more identity index maps containing pointers to the atomized identity components stored in the identity component module 260, and stores the identity index maps in the identity index module 256.

The mapping module 264 receives a request associated with a transaction of the transaction system 236, and in response provides a compliant identity to the transaction system 336 having selected atomized identity components satisfying the request. The mapping module 264 determines the selected components for the compliant identity based on the type of transaction being conducted, using a compliant identity definition for that transaction type retrieved from the mapping rules module 268. The provided compliant identity may include the selected identity components themselves, pointers to the selected identity components, or a combination thereof. The mapping module 264 retrieves pointers to the selected components from the one or more index maps of the identity index module 256, and retrieves the selected components from the identity component module 260 using the pointers. The mapping module 64 may be controlled by the user using the interface module 272.

In embodiments, an identity atomization and mapping system may include only any subset of, or an alternative connection or ordering of, the features depicted in or discussed herein in regard to FIG. 14.

Figure 15:
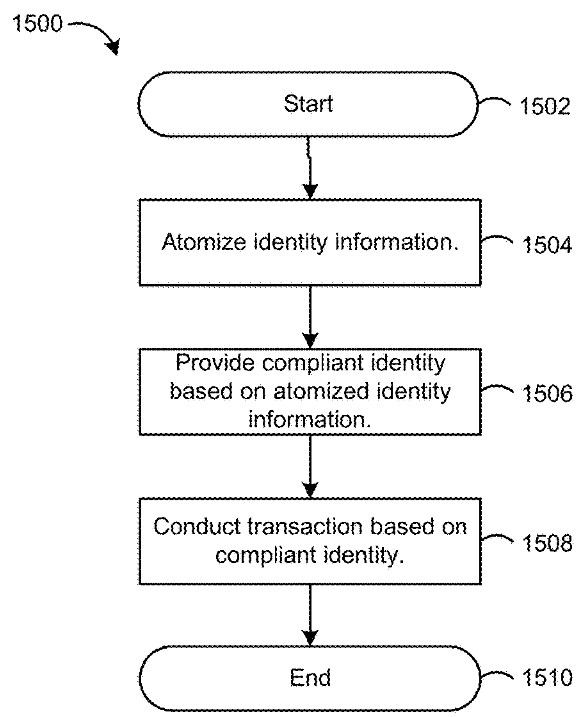
FIG. 15 is a flowchart depicting an embodiment of a method of providing a compliant identity for a transaction.

FIG. 15 depicts an embodiment of a method 1500 of providing a compliant identity for conducting a transaction. The method may be performed by or involving components of the system for conducting transactions 220 of FIG. 13, such as by embodiments of the identity atomization and mapping system 224 and the transaction system 236. The method provides identity information sufficient to satisfy the requirements of the transaction, while protecting from exposure identity information not required for the transaction. The method also enhances the efficiency of conducting transactions by providing the sufficient identity information, while reducing transmission and processing costs that would otherwise be associated with surplus identity information not provided. The method begins at step 1502. At step 1504, an atomization process is conducted to atomize identity information received for an individual into a plurality of separate components corresponding to separate attributes of the identity information, and generate an index to the atomized components. At step 1506, a compliant identity is provided for a transaction, the compliant identity containing a sufficient set of the atomized identity components for the transaction being conducted. At step 1508, the transaction is conducted based on the provided compliant identity. The method ends at step 1510.

In embodiments, a method of a method of providing a compliant identity for conducting a transaction may include only any subset of, or an alternative ordering of, the features depicted in or discussed above in regard to FIG. 15.

Figure 16:
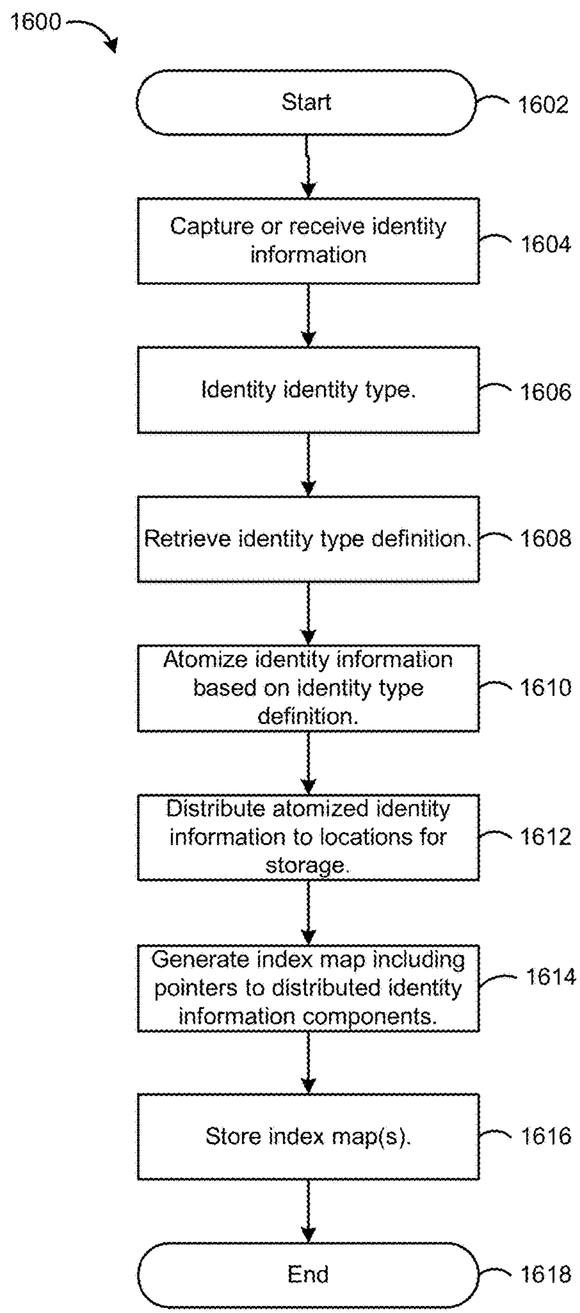
FIG. 16 is a flowchart depicting an embodiment of a method of conducting an atomization process to atomize information for use in providing a compliant identity for a transaction.

FIG. 16 depicts an embodiment of a method of conducting an atomization process to atomize identity information for use in providing a compliant identity for a transaction. Embodiments of the method 1600 may be used to perform the atomization process of step 1504 of the method 1500 of FIG. 15. The method may be performed by or involving components of the identity atomization and mapping system 224 of FIG. 14, such as by one or more of the atomization module 248, identity definition module 252, identity index module 256 or identity component module 260. The method separates identity information into attribute-level identity components, generates an index to the atomized components, and stores the index and atomized components to enable the provision of compliant identities that protect the privacy of identity information while also enhancing the efficiency of conducting transactions. The method begins at step 1602.

At step 1604, identity information is received. The identity information may be received by the atomization module 248. The receiving the identity information may include creating an electronic copy of the identity information, such as by one or more of capturing an image of the identity information, receiving the identity information electronically, or inputting the identity information via an interface. For example, one or more images of one or more identity documents containing the identity information may be captured, such as by an image sensor of the atomization module 248. In another example, an electronic form of one or more identity documents containing the identity information, such as one or more files or packets, etc., may be received, such as by an electronic communication module of the atomization module 248.

The received identity information may include identity information of a variety of different forms. For example, the identity information may include one or more state or nationally issued identity documents, such as a driver's license, passport, social security card, etc. The identity information also may include biometric information, such as one or more of a DNA segment, fingerprint, iris pattern, retina pattern, facial pattern, voice pattern, signature pattern, etc. The identity information also may include characteristics of an electronic or online identity of an individual, such as an electronic mail or social media identity, such as one or more of an e-mail address, a social media account name (such as for one or more social media platforms such as Twitter, Facebook, Instagram, Snapchat, etc.), a social media account password, etc. The identity information also may include a legal assertion being made by an individual.

At step 1606, the received identity information is processed to determine a type of the identity information. The identity information may be processed by the atomization module 248. The identity information may be processed in a number of different ways determine the type of identity information. For example, the identity information may be processed to recognize an indicator that corresponds to a specific type of identity information, such as by one or more of performing text recognition on a captured image of the identity information, performing image analysis on a captured image of the identity information, performing text parsing of an electronic form of the received identity information, etc. The indicator may include one or more of an identity type identifier in the identity information that directly identifies the identity type, such as text of the identify information identifying it as driver's license, passport, fingerprint, account name, etc., or an indicator that indirectly identifies the information as the identity type, such as particular format, graphical element, etc. of the identity information.

At step 1608, a definition for the determined identity type is retrieved. The identity type definition may be retrieved by the atomization module 248 from the identity definition module 252. The identity definition module 252 stores definitions for a plurality of different identity types that the identity atomization and mapping system 224 may receive, such as one or more of the types of identity information discussed above.

The identity type definition defines a plurality of attributes for an identity type into which the identity atomization and mapping system 224 will atomize identity information of that identity type. The identity type definition may further define an organization into which the identity atomization and mapping system 224 will place the plurality of attributes, such as ordered collection of elements representing the attributes, such as an ordered collection of one or more of fields, files, etc. representing the attributes.

In one example, for a state driver's license, the identity type definition may define a plurality of attributes of the driver's license as including one or more of a name, a date of birth, an expiration date, a restriction, a Real ID compliant status, etc. Further, the definition for a drivers license may define a structured collection of files to contain the attributes as a follows:

/state/driverlicense/name.xml
/state/driverlicense/DOB.xml
/state/driverlicense/EXP.xml
/state/driverlicense/restrictions.xml
/state/driverlicense/RealIDCompliant.xml where each attribute is to be contained in a corresponding separate file, such as an XML file, and stored in a corresponding location of a file directory structure.

In another example, for a social media identity, such as a Twitter account, the identity type definition may define a plurality of attributes of the Twitter account as including one or more of a handle, a verified status, a profile image, a background image, and a description, etc. Further, the definition for the Twitter account may define a structured collection of files to contain the attributes as a follows:

/electronic/socialmedia/Twitter/handle.xml
/electronic/socialmedia/Twitter/verified.xml
/electronic/socialmedia/Twitter/profileimage.xml
/electronic/socialmedia/Twitter/backgroundimage.xml
/electronic/socialmedia/Twitter/description.xml where each attribute is to be contained in a separate corresponding file, such as an XML file, in a corresponding location of a file directory structure.

In other examples, the identity type definition may define different types of structures to organize the attributes, such as in a plurality of structured fields of a single file or data object, etc.

At step 1610, the identity information may be atomized, i.e., separated, into a plurality of identity components, each corresponding to a different one of the identity attributes defined for that identity type. The identity information may be atomized by the atomization module 48. The atomization may process the identity information in a number of different ways to identify the identity components, such as including one or more of capturing an image of the identity information, recognizing text in an image of the identity information, processing text of the identity information, etc. For example, a captured image of the identity information may be processed to recognize text in the image, and then the recognized text may be parsed and analyzed to identify the components corresponding to the defined attributes for that identity type. The atomization may store the identified components in an organized data structure defined for that identity type. For example, for a state driver's license, the atomized components may be stored in a data structure such as the exemplary file structure discussed above.

At step 1612, the atomized identity components may be distributed to storage locations. The atomized identity components may be distributed by the atomization module 48 to storage locations of the identity component module 260. The atomized identity components may be stored in a distributed fashion. Storing the atomized identity components in a distributed fashion, and accessing the components through the use of the index data maps as discussed below, may increase the security of the stored components and any transaction relying on the stored components, such as by increasing the difficulty of violating the integrity of the stored components. To store the atomized identity components in a distributed fashion, the identity component module 260 may include a plurality of distributed storage modules 276, and the atomized identity components for a set of identity information may be stored across the plurality of distributed storage modules 276. The atomized identity components may be stored across a plurality of separate storage modules 276 in a number of different ways, such as including one or more of storing each atomized component at a different distributed storage module 276, storing each atomized component across a plurality of different distributed storage modules 276, storing a plurality of atomized components across a plurality of different distributed storage modules 276, etc.

The plurality of storage modules 276 may be structured in different ways. In embodiments, the plurality of different storage modules 276 may include locations at a corresponding plurality of different data storage systems. In such embodiments, each data storage system may be implemented using a separate computing system. In embodiments, the plurality of different data storage modules 276 may include locations at a corresponding plurality of different data storage devices. The data storage devices may include hard drives, flash memories, etc. In such embodiments, a plurality of the different data storage devices may be part of a single data storage system, part of a plurality of different data storage systems, or combinations thereof. In embodiments, the plurality of different data storage modules 276 may include multiple locations on a single data storage system or device. In such embodiments, each of the plurality of different data storage modules 276 may require a separate storage and/or access transaction, or set of steps, to store and/or access data at that data storage location. In one example, the plurality of different data storage modules 276 may be within a plurality of different partitions of, or behind other logical or physical boundaries within, the data storage system or device that would require such separate transactions or sets of steps.

At step 1614, an index map to the stored atomized identity components is generated. The index map may be generated by the atomization module 248. The index map includes a list of pointers to storage locations of the atomized identity components, for use by other components of the identity atomization and mapping system, such as the identity mapping module 264, to retrieve, and potentially create further data maps to, the identity components. The index map may be organized to enable access to selected sets of one or more pointers. For example, the index map may be organized one or more of as a searchable list, according to types of identity information, using a file directory structure of the stored components, etc. Optionally, a plurality of different index maps may be generated at step 1614, such as one or more index maps for each type of identity information having stored atomized identity components.

At step 1616, the generated index map is stored. The index map may be stored by the atomization module 248 in the index module 256. The method ends at step 1618.

In embodiments, a method of conducting an atomization process to atomize identity information for use in providing a compliant identity for a transaction may include only any subset of, or an alternative ordering of, the features depicted in or discussed above in regard to FIG. 16.

Figure 17:
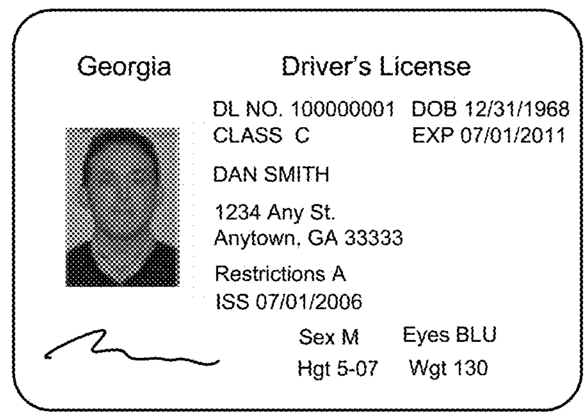
FIG. 17 depicts an embodiment of identity information.

FIG. 17 depicts an embodiment of identity information that may undergo an atomization process of FIG. 16. In FIG. 17 the identity information is a state-issued driver's license. The driver's license has a plurality of attributes including a state that issued the driver's license, an identifier identifying the document as a driver's license, a picture of the individual for whom the driver's license was issued, a signature of the individual, a driver's license number, a class of the driver's license, a date of birth of the individual, an expiration date of the driver's license, a name of the individual, an address of the individual, restrictions on the driver's license, an issue date of the driver's license, a gender of the individual, an eye color of the individual, a height of the individual, a weight of the individual, a Real ID compliant status, etc. The atomization process may perform one or more of capturing an image of the driver's license, recognizing text and graphical elements in the captured image, processing the recognized text to identify the above attributes, creating identity components containing the attributes according a retrieved identity type definition for a driver's license, storing the atomized identity components in a distributed fashion, creating an index map to the stored components, and storing the index map.

Figure 18:
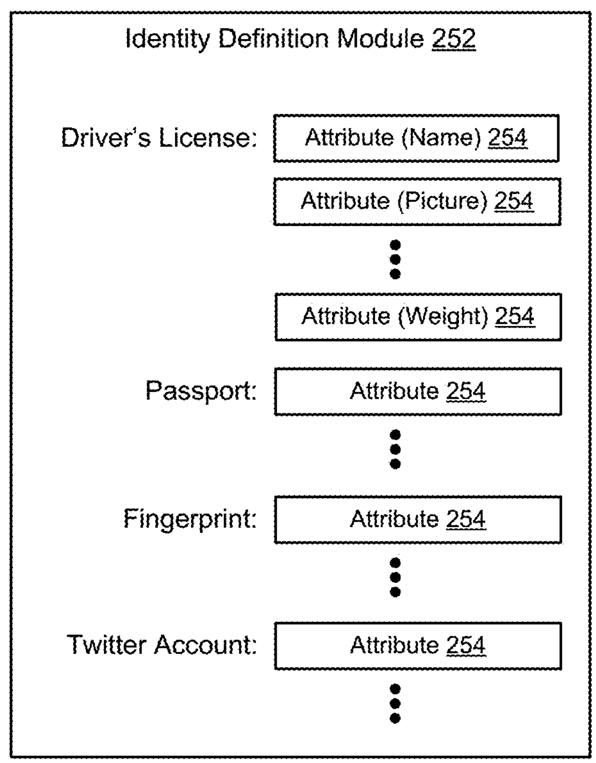
FIG. 18 is a schematic diagram depicting an embodiment of an identity definition module of the identity atomization and mapping system.

FIG. 18 depicts an embodiment of the identity definition module 252 storing exemplary identity type definitions for a plurality of different identity types, including for a driver's license such as depicted in FIG. 17. Each of the identity type definitions includes an attribute element 254 for each attribute of the corresponding identity type, having an indication of what information that attribute includes, and optionally of a data structure in which to store the attribute as an atomized component. An attribute element 254 may be stored in a variety of formats, such as as a data field in a file, as a separate file, etc. In the depicted example, for the driver's license, the identity type definition includes elements 254 corresponding to each of the plurality of attributes of the driver's license, such as the state of issue, picture of the individual, signature of the individual, driver's license number, class of the driver's license, date of birth of the individual, expiration date of the driver's license, name of the individual, address of the individual, restrictions on the driver's license, issue date of the driver's license, gender of the individual, eye color of the individual, height of the individual, weight of the individual, RealID compliant status, etc. The exemplary identity definition module also includes definitions for other identity types, such as for a passport, fingerprint, Twitter account, etc.

Figure 19:
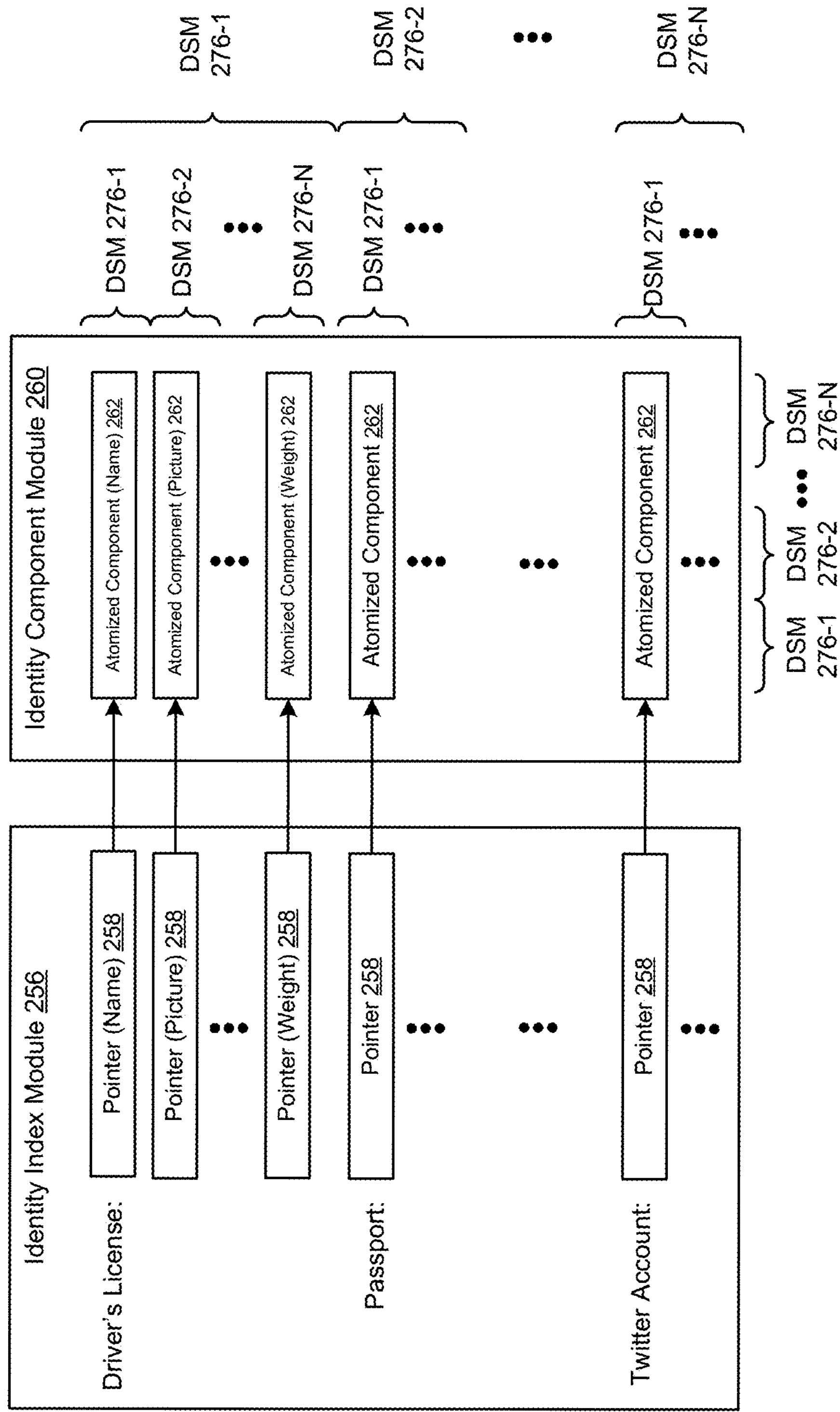
FIG. 19 is a schematic diagram depicting embodiments of an identity index module and an identity component module of the identity atomization and mapping system.

FIG. 19 depicts embodiments of the identity index module 256 storing an exemplary index map and the identity component module 60 storing exemplary atomized identity components produced by the atomization process, including as produced for the driver's license of FIG. 17. The index map includes a plurality of pointer elements 258 for each set of identity information, such as the driver's license, each pointer element 258 pointing, for a respective one of the attributes of the identity information, to the storage location in the identity component module 260 of a corresponding atomized identity component. A pointer element 258 may be stored in a variety of formats, such as as a data field in a file, as a separate file, etc. The exemplary index map also includes pointer elements 258 to other atomized identity information, such as for a passport, for a fingerprint, for a Twitter account, etc. Alternatively, exemplary index maps may include pointers for only a single set of identity information, such as the driver's license, or for various different collections of identity information.

The identity component module 260 stores at least one atomized identity component 262 for each of the attributes of the sets of identity information, such as the driver's license. An atomized identity component 262 may store the corresponding attribute in a variety of formats, such as as a data field in a file, as a separate file, etc. An atomized identity component also may store the corresponding attribute as processed in a variety of ways, such as one or more of encoded, encrypted, etc. The atomized identity components may be distributed among the distributed storage modules 276 of the identity component module 260 in a variety of ways. On the right hand side and bottom of FIG. 19, several different possibilities for distribution of the plurality of identity components 262 across a plurality of the distributed storage modules 276-1 . . . 276-N of the identity component module are shown. In a first scenario shown at the right, each atomized identity component is stored in a different distributed storage module 276-1 . . . 276-N. In a second scenario shown at the right, the atomized identity components for each particular set of identity information, such as for a particular identity document, are stored in a different distributed storage module 276-1 . . . 276-N. In a third scenario shown at the bottom, the atomized identity components for a particular set of identity information, such as for a particular identity document, are each stored across a plurality of different distributed storage module 276-1 . . . 276-N. Other distributions are also possible.

In embodiments, the identity information may be atomized into and stored as identity components, and the index map generated and stored, according to the systems and methods of the distributed data architecture discussed above. For example, the identity information may correspond to a data element that is to be fragmented and distributed, with the atomization process fragmenting and distributing the identity information as atomized identity components, the atomized identity components corresponding to data fragments, and the generated index map corresponding to a data map.

In this regard, the systems and methods of the distributed data architecture discussed above may be utilized for the atomization process, atomized identity components, index map, etc. The atomization process may incorporate the method of FIG. 6, or any individual one or any combination and/or order of the steps of the method of FIG. 6. For example, step 1610 through step 1616 of the method of FIG. 16 may be performed using the method of FIG. 6, or any individual one or any combination and/or order of the steps of the method of FIG. 6. An index map may be stored as a data map as depicted in FIG. 2, or using any individual one or any combination and/or order of the features of the data map of FIG. 2. For example, the index map may be stored with each pointer element 258 using the structure and/or fields of the map element 32, or using any individual one or any combination and/or order of the structure and/or fields of the map element 32, of the embodiment of FIG. 2. An atomized identity component may be stored a data fragment as depicted in FIG. 3, or using any individual one or any combination and/or order of the features of the data fragment of FIG. 3. For example, the atomized identity component may be stored using the structure and/or fields of the data fragment 24, or using any individual one or any combination and/or order of the structure and/or fields of the data fragment 24, of the embodiment of FIG. 3.

In exemplary embodiments, an individual atomized identity component may correspond to an individual data fragment. That is, the atomization process may break the identity information into individual attributes, and store each of the individual attributes as a respective atomized identity component, with each atomized identify component being treated as a data fragment in the distributed data architecture.

In other exemplary embodiments, an individual atomized identity component may correspond to a plurality of data fragments. That is, the atomization process may break the identity information into individual attributes as a respective atomized identity component, with an individual atomized identity component being fragmented into a plurality of data fragments in the distributed data architecture. For example, an atomized identity component corresponding to an individual attribute may be fragmented into a plurality of data fragments, the fragments distributed across a plurality of different distributed storage modules 276, and the index map may include a plurality of pointers for each atomized identity component, each pointer pointing to a corresponding fragment of the identity component.

Figure 20:
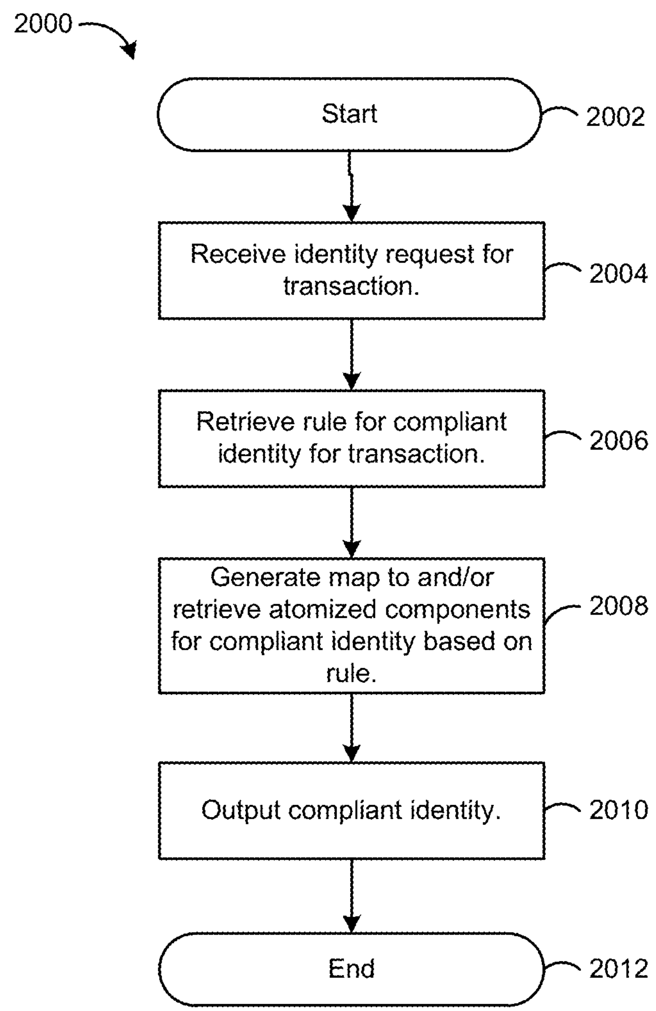
FIG. 20 is a flowchart depicting an embodiment of a method of providing a compliant identity for a transaction based on atomized identity components.

FIG. 20 depicts an embodiment of a method 2000 of providing a compliant identity for a transaction based on atomized identity information. Embodiments of the method 2000 may be used to perform the providing of the compliant identity of step 1506 of the method 1500 of FIG. 15. The method may be performed by or involving components of the identity atomization and mapping system 224 of FIG. 14, such as by one or more of the identity mapping module 264, mapping rules module 268, identity index module 256, identity component module 260 or interface module 272. The method provides a compliant identity having identity information sufficient to satisfy the requirements of the transaction, but protects from exposure identity information not required for the transaction, while also enhancing the efficiency of the transaction by reducing transmission and processing costs that would otherwise be associated with providing surplus identity information. The method begins at step 2002.

At step 2004, a request associated with a transaction is received. The request may be received by the identity mapping module 264. The request may be for identity information sufficient to enable the transaction to proceed. For example, for a transaction to purchase alcohol, the request may be for identity information sufficient to prove that the purchasing individual is of the correct age to purchase alcohol. For a transaction to enter a secure passenger area at an airport, the request may be for REAL ID compliant identity information for the passenger seeking to enter the area. For a transaction to purchase an item, the request may be for credit or banking account information for the purchasing individual.

Figure 21:
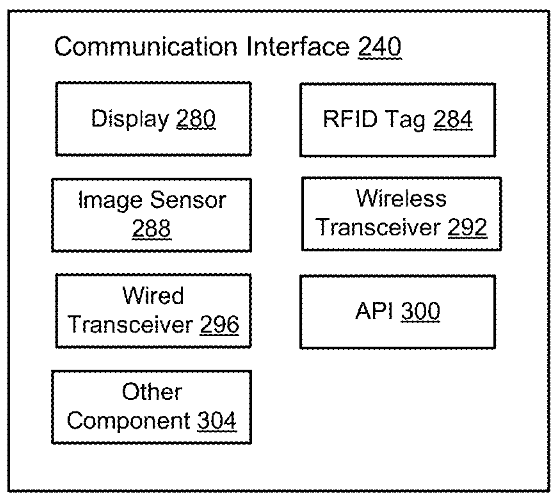
FIG. 21 is a schematic diagram depicting an embodiment of a communication interface of an identity mapping module of the identity atomization and mapping system.

The request may be received by the identity mapping module 264 in a number of different ways. The request may be received by the communication interface 240 of the identity mapping module. The communication interface may include one or more components configured to receive the request. FIG. 21 depicts an embodiment of the communication interface 240 including at least one component configured to receive the request, including one or more of: a display 280, a radio-frequency identification (RFID) tag 284, an image sensor 288, a wireless electronic transmission transceiver 292, a wired electronic transmission receiver 296, an application programming interface (API) 300, or other component 304. In exemplary embodiments, the identity mapping module 264, or one or more components of the identity mapping module 264 such as the communication interface 240, may be located on the user device 228, and may receive the request as an input to the user device 228 during the transaction via the communication interface 240. For example, the communication interface 240 may include in input element on a touchscreen embodiment of the display 280 configured to receive the request as a touch input, the radio-frequency identification (RFID) tag 284 configured to receive the request as an RF transmission, the image sensor 288 configured to take an image of an element representing the request, or the wireless or wired electronic transmission transceivers 292, 296 configured to receive transmissions including the request. Alternatively or additionally, in other exemplary embodiments, the identity mapping module 264, or one or more components of the identity mapping module 264 such as the communication interface 240, may be located on the identity server system 232, and may receive the request as part of the server system 232 being involved with the transaction. For example, the communication interface 240 may include the API 300 configured to receive a program input as the request.

The request may take a variety of different forms. The request may include one or more of information identifying the type of transaction being conducted, information identifying the type of transaction being conducted, or information signaling the performance of a transaction, etc.

At step 2006, a rule defining a compliant identity responsive to the request is retrieved. The rule may be retrieved by the identity mapping module 664 from the mapping rules module 68. The rule defines identity components needed to be included in the compliant identity.

Figures 22, 23:
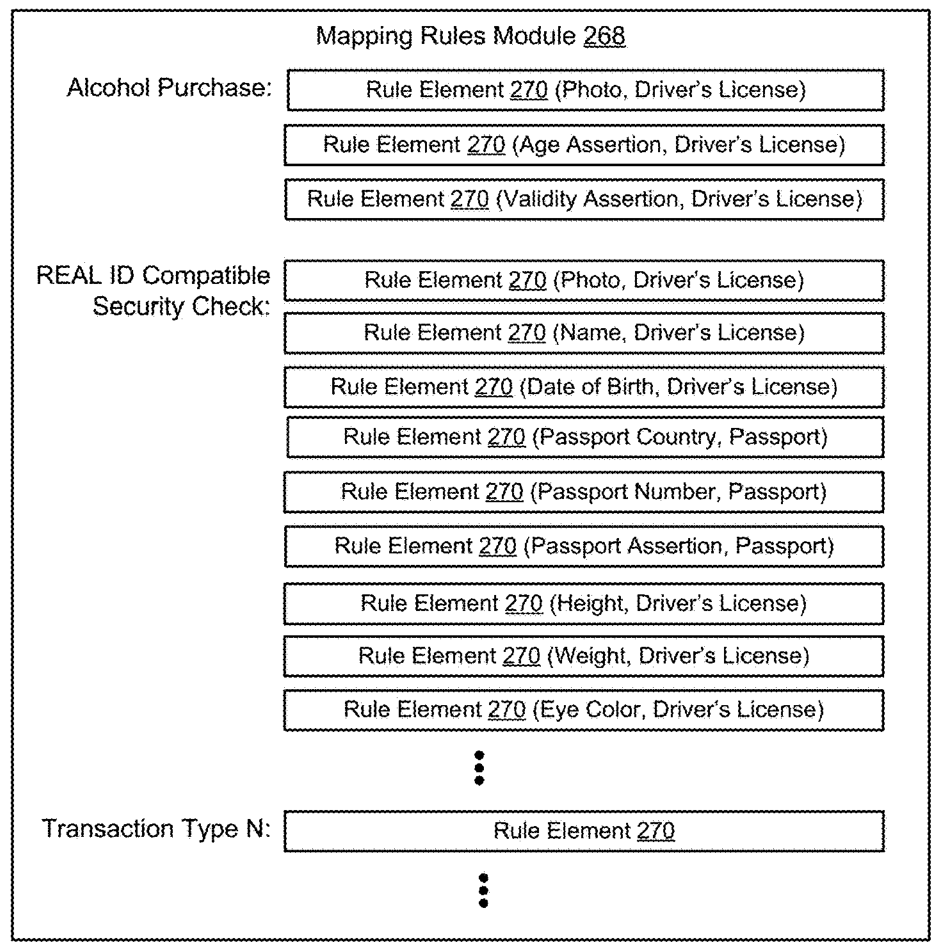
FIG. 22 is a schematic diagram depicting an embodiment of a mapping rules module of the identity atomization and mapping system.
FIG. 23 depicts an embodiment of a compliant identity provided by the identity atomization and mapping system.

FIG. 22 depicts an embodiment of the mapping rules module 268 storing exemplary mapping rules for compliant identities for a plurality of different transaction types. Each of the rules is associated with a corresponding transaction type and includes one or more rule elements 270 identifying one or more atomized identity components necessary to compose a compliant identity for that transaction type. A rule element 270 may be stored in a variety of formats, such as as a data field in a file, as a separate file, etc. In the depicted example, for an alcohol purchase, a rule may include rule elements 270 identifying an image of the individual, an assertion that the individual is over the age to purchase alcohol, and an assertion that the utilized identity is valid. For a REAL ID compatible security check, a rule may include rule elements 270 identifying an image of the individual, a name of the individual, a date of birth of the individual, a country of origin of the passport of the individual, a passport number of the passport, a legal assertion that the passport is valid, a height of the individual, a weight of the individual, an eye color of the individual.

To identify an identity component, a rule element 270 may identify one or more of the atomized identity component itself, the attribute corresponding to the atomized identity component, the set of identity information from which the attribute or atomized component is generated, etc.

A rule may include rule elements 270 identifying components taken from or based on a single set of identity information, such as a single identity document. The creation of a compliant identity using such a rule may enable the provision of identity information from the identity document sufficient for conducting the transaction, but protect from exposure identity information from the identity document unnecessary for the transaction. For example, the components identified by the exemplary rule for an alcohol purchase depicted in FIG. 19 are taken from or based on a single state or country issued identity document, such as a state driver's license. The creation of a compliant identity based on such an exemplary rule provides information from the driver's license sufficient to enable the purchase of alcohol, but protects from exposure other identity information from the driver's license, such as, e.g., the address of the individual.

A rule may include rule elements 270 identifying components taken from or based on multiple different sets of identity information, such as multiple different identity documents. For example, the components identified by the exemplary rule for a REAL ID compliant security check depicted in FIG. 19 may be taken from or based on multiple different state or country issued identity documents, such as a passport and a driver's license. The creation of a compliant identity using such a rule may leverage identity information from multiple identity documents to provide of identity information sufficient for conducting the transaction, where any single one of the identity documents may have not contained sufficient information, but protect from exposure identity information from the identity documents unnecessary for the transaction. For example, the components identified by the exemplary rule for a REAL ID compatible security check depicted in FIG. 19 are taken from or based on both a passport and a driver's license (that is, the image of the individual, the name of the individual, the date of birth of the individual, the height of the individual, the weight of the individual, and the eye color of the individual are taken from the driver's license; and the country of origin of the passport, the passport number, and the legal assertion that the passport is valid are taken from or based on the passport). The creation of a compliant identity based on such an exemplary rule provides information sufficient to comply with REAL ID requirements, where one of the documents by itself may have been insufficient, such as in the case of using passport information to supplement, and make REAL ID compatible, a driver's license that is not REAL ID compatible, while protecting from exposure other identity information from the driver's license and passport.

Returning to FIG. 20, at step 2008, the identified identity components, pointers to the identified identity components, or combinations thereof, are retrieved for composing the compliant identity. The pointers and identity components may be retrieved by the identity mapping module 264 from the identity index module 256 and the identity component module 260. Pointers to storage locations of the identity components in the identity component module 260 are retrieved from the identity index map of the identity index module 256. Identity components are retrieved by first retrieving pointers to the storage locations of the identity components in the identity component module 60 from the identity index map of the identity index module 256, and then retrieving the identity components from their storage locations in the identity component module 260 using the pointers.

At step 2010, the compliant identity having information for the identified identity components is output. Providing the compliant identity provides identity information sufficient to satisfy the requirements of the transaction, while protecting from exposure identity information not required for the transaction, and also enhances the efficiency of conducting transactions by providing the sufficient identity information, while reducing transmission and processing costs that would otherwise be associated with surplus identity information not provided.

The compliant identity may include elements for each of the atomized identity components identified by the rule being utilized, each element including the identity component itself or the pointer to the identity component. Thus the compliant identity may include atomized identity components, pointers to identity components, or combinations thereof.

The compliant identity may be output by the identity mapping module 264 to the transaction system 236. The compliant identity may be output by the identity mapping module 264 in a number of different ways. The compliant identity may be output by the communication interface 240 of the identity mapping module. For example, in exemplary embodiments where the identity mapping module 264, or one or more components of the identity mapping module 264 such as the communication interface 240, is located on the user device 228, the communication interface 240 may output the compliant identity as part of an output by the user device during the transaction. For example, the communication interface may include the display 280 configured to display the compliant identity, the RFID tag 284 configured to communicate signals representing the compliant identity, the wireless or wired electronic transmission transceiver 292, 296 configured to output signals representing the compliant identity. Alternatively or additionally, in other exemplary embodiments where the identity mapping module 264, or one or more components of the identity mapping module 264 such as the communication interface 240, is located on the identity server system 232, the communication interface 240 may output the compliant identity as part of the server system 232 being involved with the transaction. For example, the communication interface 240 may include the API 300 configured to provide a program output representing the compliant identity. The method ends at step 2012.

In embodiments, a method of providing a compliant identity for a transaction based on atomized identity information may include only any subset of, or an alternative ordering of, the features depicted in or discussed above in regard to FIG. 20.

FIG. 23 depicts an exemplary embodiment of a compliant identity output by the identity mapping module 64 corresponding to the exemplary rule discussed above for creating a REAL ID compatible identity. The compliant identity is output as a display by a display of the communication interface of the identity mapping module. The compliant identity includes textual and graphical elements corresponding to the image of the individual, name of the individual, date of birth of the individual, country of origin of the passport of the individual, passport number of the passport, legal assertion that the passport is valid, height of the individual, weight of the individual, eye color of the individual, a legal assertion that the presented identity is REAL ID compliant.

The compliant identity may also include an encoding of some or all of the included identity components. Such an encoding may take the form of a bar code, two dimensional bar code, hash, etc. of the identity components. The encoding of the identity components may serve a variety of purposes, such as communication the identity components themselves, providing a means of checking the validity of the compliant identity, etc. In the embodiment of FIG. 20, the compliant identity includes a two dimensional bar code serving one or more of the above purposes.

The identity atomization and mapping system may be encapsulated in a number of different ways within systems such as user, transaction and sever systems and/or devices. FIG. 23 depicts embodiments of different encapsulations of the identity atomization and mapping system within user, transaction and sever systems and/or devices, and corresponding data flows for performance of embodiments of the method of FIG. 20. As shown at the top of FIG. 23, in embodiments, the identity mapping module 264 and mapping rules module 268 are located in the user device 228, and the identity index module 256 and identity component module 260 are located in one or more identity server systems 232. The identity mapping module 264 receives a request from the transaction system 236 related to a transaction, generates and sends to the mapping rules module 268 a request for a compliant identity definition for the type of transaction identified according to the request, receives at least one rule from the mapping rules module 268 defining a corresponding compliant identity, generates and sends to the identity index module 256 a request for pointers corresponding to components of the defined compliant identity, receives the pointers to the identity components from the identity index module 256, generates and sends to the identity component module 260 requests for the components of the defined compliant identity, receives the identity components from the identity component module 260, and outputs the compliant identity to the transaction system 236. For example, the user device 228 may receive the request and provide the compliant identity to and from the transaction system 36 using the communication module 240 of the identity mapping module 264, such as including one or more of the display, RFID tag, image sensor, wireless communication connection, wired communication connection, etc.

Returning to step 1508 of the method of FIG. 15, the transaction may be conducted based on the provided identity by or involving components of the system for conducting transactions 220 of FIG. 13, such by one or more of the identity atomization and mapping system 224 or transaction system 236. Conducting the transaction based on the provided compliant identity may include one or more of verifying that the provided identity is indeed compliant with an expected identity type, verifying that the individual identified by the provided identity is an authorized individual for the transaction, implementing any necessary steps to conduct the mechanics of the transaction, etc. For example, for security transactions, in which the user provides identity information to prove his or her identity to the transaction system, such as at an airport, building, venue, border, etc., to gain access to a restricted area, such as to a secure area, across a border, etc., the conducting the transaction may include one or more of verifying that the provided identity is compliant with an expected identity type for the type of restricted area being accessed (e.g., having components from a state or country issued license or passport for entering an airport security area, or from a building identification for entering a building, etc.), verifying that the individual identified by the provided identity is an authorized individual for the transaction (e.g., being a citizen of certain countries for entering an airport security area or crossing a border, a person on a list of authorized personnel for entering a building, etc.), or implementing any necessary steps to conduct the mechanics of the transaction (e.g., providing a signal indicating that access is allowed, or providing a signal enabling a machine to provide the access, such as open a gateway and/or release a lock, etc.). In another example, for financial transactions, in which the user provides identity information to conduct and/or authorize conducting of a financial transaction, such as purchasing an item, making a payment, exchanging currency, etc., such as either in person at a point-of-sale location or online, etc., the conducting the transaction may include one or more of verifying that the provided identity is compliant with an expected identity type for the type of financial transaction being conducted (e.g., having identity and/or account information components expected for that type of financial transaction), verifying that the individual identified by the provided identity is an authorized individual for the transaction (e.g., a person meeting certain legal or financial requirements for conducting that type of financial transaction), or implementing any necessary steps to conduct the mechanics of the transaction (e.g., providing a signal to transfer an item or ownership of an item, such as currency, securities, or other financial instruments, etc.).

Figure 24:
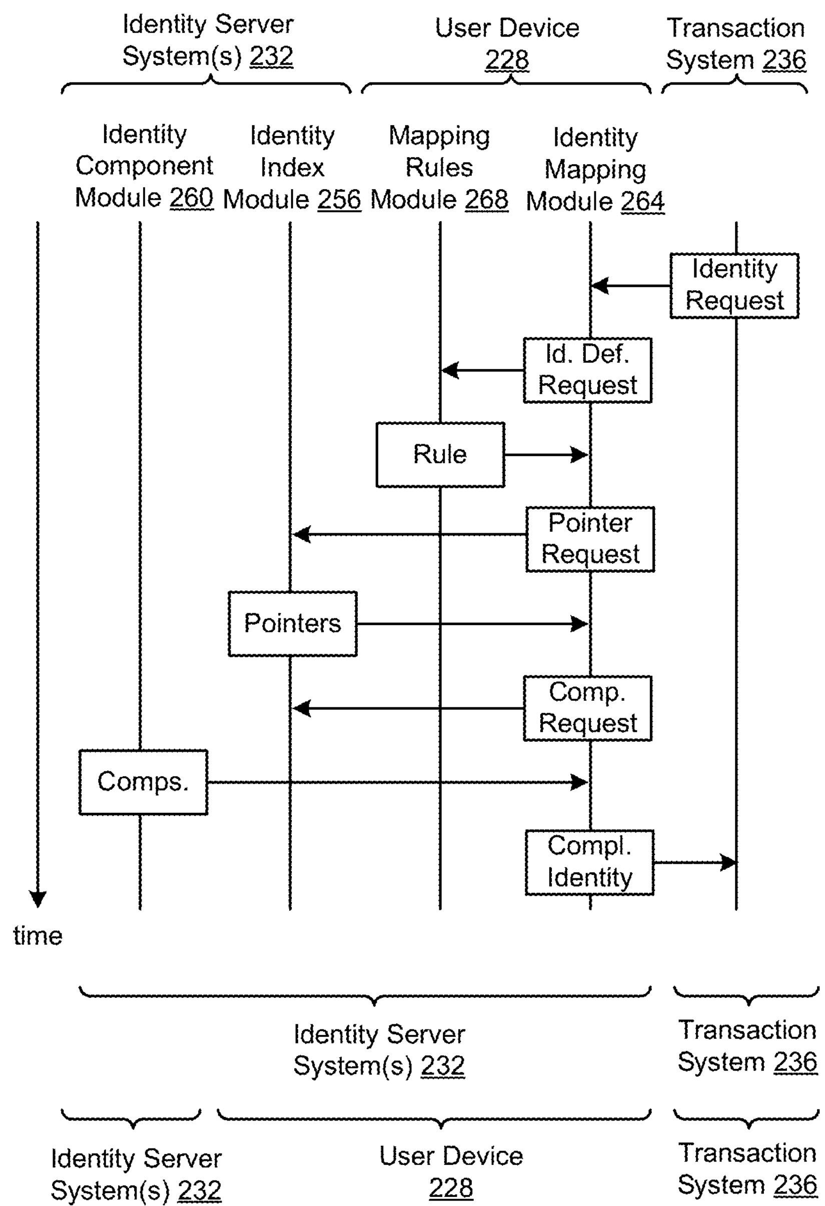
FIG. 24 is a data flow diagram depicting embodiments of distribution of components of the identity atomization and mapping system and corresponding data flows among a user device, identity server system(s), and a transaction system.

FIG. 24 also depicts at the bottom of the figure alternative encapsulations of the identity atomization and mapping system 224 and corresponding function and data flows within user, transaction and sever systems and/or devices. In the first alternative, the entire identity atomization and mapping system 224, including the identity mapping module 264, mapping rules module 268, identity index module 256, and identity component module 260, are located in one or more identity server systems 232. In such embodiments, the server system(s) 232 may receive the request and provide the compliant identity to and from the transaction system 236 using a communication module 240 of the identity mapping module 264, such as including one or more of an API, wireless communication connection, wired communication connection, etc. In the second alternative, the identity mapping module 264, mapping rules module 268, and identity index module 256 are located on the user device 228, while the identity component module 60 is located in one or more identity server systems 232.

The computer system depicted in FIG. 5 also may be used to implement the identity atomization and mapping system, transaction system, user system, identity provider system, and/or any individual one, subset, or all of the components thereof. The processor 164 executes program instructions stored in the non-transitory machine-readable storage medium 168 to perform the functionality of the component it is implementing as discussed herein. The communication circuit 172 can be controlled by the processor 164 to communicate with other devices, such as the identity atomization and mapping system, transaction system, user system, identity provider system, to perform the functionality of the component it is implementing as discussed herein. The optional other components 176 may include any further components required by the computer system 160 to perform this functionality.

Additional embodiments of the identity atomization and mapping system 224, transaction system 236, user device 228, identity server system 232, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of providing identity information, the method comprising:

atomizing identity information from an identity document into a plurality of identity components;

distributing the identity components to a plurality of different storage locations;

generating and storing an identity information index map including a list of pointers to the distributed identity components;

receiving, from a transaction system, a request regarding a transaction;

retrieving at least one rule defining identity attributes of a compliant identity based on a type of the transaction associated with the request;

retrieving the identity index map including the list of pointers to the identity components;

selecting pointers from the identity index map pointing to specific identity components corresponding to the identity attributes of the compliant identity identified by the at least one rule; and outputting, to the transaction system, the compliant identity including information corresponding to the identity components corresponding to the identity attributes of the compliant identity, the information including for each identity component of the identity components corresponding to the identity attributes of the compliant identity at least one of: a selected pointer to the identity component, or the identity component; wherein the outputting the compliant identity outputs information corresponding to at least some but less than all of the plurality of identity components of the identity document.

2. The method of claim 1, wherein the outputting the compliant identity outputs information for identity components corresponding to attributes of plurality of different sets of identity information.

3. The method of claim 2, wherein the plurality of different sets of identity information include at least two of: a state issued identity, a country issued identity, a biometric trait, or online account data.

4. The method of claim 2, wherein the identity document is one of: a state issued identity document, or a country issued identity document.

5. The method of claim 1, further comprising conducting the transaction based on the provided compliant identity.

6. The method of claim 5, wherein conducting the transaction includes at least one of:

conducting the transaction to gain access to a restricted area based on the provided compliant identity, or conducting a financial transaction based on the provided compliant identity.

7. The method of claim 1, wherein receiving the request includes receiving the request at a communication interface from the transaction system.

8. The method of claim 7, wherein receiving the request includes receiving at least one of: a display of request at the communication interface, or an electronic transmission of the request at the communication interface.

9. The method of claim 1, wherein outputting the compliant identity includes outputting the compliant identity to the transaction system at a communication interface.

10. The method of claim 1, wherein outputting the compliant identity includes at least one of: transmitting the compliant identity to the transaction system, or displaying the compliant identity to the transaction system.

11. The method of claim 1, wherein the request includes an identification of the type of the transaction.

12. The method of claim 1, further comprising determining the type of the transaction based on the request.

13. The method of claim 1, further comprising:

receiving identity information for a plurality of different sets of identity information of a plurality of different identity types;

retrieving stored identity type definitions for the plurality of different identity types, the identity type definitions defining a plurality of attributes of the corresponding identity type;

atomizing the identity information of each of the plurality of different sets of identity information into the available atomized identity information based on the plurality of identity type definitions.

14. The method of claim 1, further comprising:

encrypting the identity information components.

15. The method of claim 1, further comprising:

receiving the identity document for an individual;

identifying an identity type of the identity information based on content of the identity document; and retrieving a stored identity type definition based on the identity type, the identity type definition including a plurality of attributes of the identity type.

16. The method of claim 15, wherein receiving the identity document includes capturing an image of the identity document.

17. The method of claim 15, wherein receiving the identity document includes receiving a transmission of the identity document.

18. A system, comprising:

at least one non-transitory machine readable storage medium having program instructions, mapping rules, and an index map; and at least one processor configured to execute the program instructions to perform a method of providing identity information, the method including:

atomizing identity information from an identity document into a plurality of identity components;

distributing the identity components to a plurality of different storage locations;

generating and storing an identity information index map including a list of pointers to the distributed identity components;

receiving, from a transaction system, a request regarding a transaction;

retrieving at least one rule defining identity attributes of a compliant identity based on a type of the transaction associated with the request;

retrieving the identity index map including the list of pointers to the identity components;

selecting pointers from the identity index map pointing to specific identity components corresponding to the identity attributes of the compliant identity identified by the at least one rule; and outputting, to the transaction system, the compliant identity including information corresponding to the identity components corresponding to the identity attributes of the compliant identity, the information including for each identity component of the identity components corresponding to the identity attributes of the compliant identity at least one of: a selected pointer to the identity component, or the identity component; wherein the outputting the compliant identity outputs information corresponding to at least some but less than all of the plurality of identity components of the identity document.

19. The system of claim 18, wherein:

the outputting the compliant identity outputs information for identity components corresponding to attributes of plurality of different sets of identity information.

20. The system of claim 18, wherein:

receiving the request includes receiving at least one of: a display of request at the communication interface, or an electronic transmission of the request at the communication interface; and outputting the compliant identity includes at least one of: transmitting the compliant identity to the transaction system, or displaying the compliant identity to the transaction system.

21. The system of claim 18, the method further comprising conducting the transaction based on the provided compliant identity, including at least one of:

conducting the transaction to gain access to a restricted area based on the provided compliant identity, or conducting a financial transaction based on the provided compliant identity.

22. The system of claim 18, the method further including:

receiving the identity document for an individual;

identifying an identity type of the identity document based on content of the identity information; and retrieving a stored identity type definition based on the identity type, the identity type definition including a plurality of attributes of the identity type.

23. A non-transitory machine-readable storage medium having program instructions, which when executed cause a method of providing identity information to be performed, the method comprising:

atomizing identity information from an identity document into a plurality of identity components;

distributing the identity components to a plurality of different storage locations;

generating and storing an identity information index map including a list of pointers to the distributed identity components;

receiving, from a transaction system, a request regarding a transaction;

retrieving at least one rule defining identity attributes of a compliant identity based on a type of the transaction associated with the request;

retrieving the identity index map including the list of pointers to the identity components;

selecting pointers from the identity index map pointing to specific identity components corresponding to the identity attributes of the compliant identity identified by the at least one rule; and outputting, to the transaction system, the compliant identity including information corresponding to the identity components corresponding to the identity attributes of the compliant identity, the information including for each identity component of the identity components corresponding to the identity attributes of the compliant identity at least one of: a selected pointer to the identity component, or the identity component; wherein the outputting the compliant identity outputs information corresponding to at least some but less than all of the plurality of identity components of the identity document.

* * * * *